(12) United States Patent
Ghadiok et al.

(10) Patent No.: US 11,175,145 B2
(45) Date of Patent: *Nov. 16, 2021

(54) SYSTEM AND METHOD FOR PRECISION LOCALIZATION AND MAPPING

(71) Applicant: Nauto, Inc., Palo Alto, CA (US)

(72) Inventors: Vaibhav Ghadiok, Palo Alto, CA (US); Michael Gleeson-May, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/239,009

(22) Filed: Jan. 3, 2019

(65) Prior Publication Data

US 2019/0137280 A1 May 9, 2019

Related U.S. Application Data

(63) Continuation of application No. 15/673,098, filed on Aug. 9, 2017, now Pat. No. 10,209,081.

(Continued)

(51) Int. Cl.
*G01C 21/28* (2006.01)
*G06K 9/00* (2006.01)
(Continued)

(52) U.S. Cl.
CPC .............. *G01C 21/28* (2013.01); *G01C 21/30* (2013.01); *G01C 21/34* (2013.01);
(Continued)

(58) Field of Classification Search
CPC ............... G05D 1/0291; G05D 1/0088; G05D 2201/0213; G05D 1/0246; G05D 1/0274;
(Continued)

(56) References Cited

U.S. PATENT DOCUMENTS 5,584,035 A  12/1996 Duggan et al.
5,615,116 A * 3/1997 Gudat .................... G08G 1/202
                                                  701/23

(Continued)

FOREIGN PATENT DOCUMENTS

DE  102009005730      7/2010
DE  102009005730 A1  7/2010
(Continued)

OTHER PUBLICATIONS

"Which P&C Insurers Have Filed Patents Related to Autonomous Vehicles", Dec. 14, 2016, https://www.cbinsights.com/research/autonomous-vehicle-insurance-patents/?ReillyBrennanFoT, downloaded from the internet on Sep. 4, 2018.

(Continued)

*Primary Examiner* — Angelina Shudy
(74) *Attorney, Agent, or Firm* — Vista IP Law Group, LLC

(57) ABSTRACT

A method for localization and mapping, including recording an image at a camera mounted to a vehicle, the vehicle associated with a global system location; identifying a landmark depicted in the image with a landmark identification module of a computing system associated with the vehicle, the identified landmark having a landmark geographic location and a known parameter; extracting a set of landmark parameters from the image with a feature extraction module of the computing system; determining, at the computing system, a relative position between the vehicle and the landmark geographic location based on a comparison between the extracted set of landmark parameters and the known parameter; and updating, at the computing system, the global system location based on the relative position.

17 Claims, 9 Drawing Sheets

Related U.S. Application Data

(60) Provisional application No. 62/492,790, filed on May 1, 2017, provisional application No. 62/372,633, filed on Aug. 9, 2016.

(51) Int. Cl.

| | | |
|---|---|---|
| *G06K 9/20* | (2006.01) | |
| *G06K 9/46* | (2006.01) | |
| *G06T 7/73* | (2017.01) | |
| *G05D 1/02* | (2020.01) | |
| *G01C 21/34* | (2006.01) | |
| *G06F 16/29* | (2019.01) | |
| *G06F 16/23* | (2019.01) | |
| *G06F 16/58* | (2019.01) | |
| *G01C 21/30* | (2006.01) | |
| *G06K 9/62* | (2006.01) | |

(52) U.S. Cl.
CPC ....... *G01C 21/3476* (2013.01); *G05D 1/0246* (2013.01); *G05D 1/0274* (2013.01); *G06F 16/2379* (2019.01); *G06F 16/29* (2019.01); *G06F 16/5866* (2019.01); *G06K 9/00818* (2013.01); *G06K 9/2054* (2013.01); *G06K 9/46* (2013.01); *G06T 7/73* (2017.01); *G06T 7/74* (2017.01); *G05D 2201/0213* (2013.01); *G06K 9/6256* (2013.01); *G06K 2209/21* (2013.01); *G06T 2207/10016* (2013.01); *G06T 2207/30204* (2013.01); *G06T 2207/30241* (2013.01); *G06T 2207/30244* (2013.01); *G06T 2207/30252* (2013.01)

(58) Field of Classification Search
CPC ...... G01C 21/165; G01C 21/28; G01C 21/30; G01C 21/34; G01C 21/3476; G01C 21/3602; G06K 2209/21; G06K 9/00818; G06K 9/2054; G06K 9/46; G06K 9/6256; G06T 2207/10016; G06T 2207/30204; G06T 2207/30241; G06T 2207/30244; G06T 2207/30252; G06T 7/73; G06T 7/74; B60W 60/00; B60W 60/001; G06F 16/29; G06F 16/2379; G06F 16/5866

See application file for complete search history.

(56) References Cited

U.S. PATENT DOCUMENTS

| | | | |
|---|---|---|---|
| 5,638,116 | A | 6/1997 | Shimoura et al. |
| 5,642,106 | A | 6/1997 | Hancock et al. |
| 5,798,949 | A | 8/1998 | Kaub |
| 5,898,390 | A * | 4/1999 | Oshizawa .............. G01C 22/02 340/988 |
| 5,961,571 | A | 10/1999 | Gorr et al. |
| 6,018,728 | A | 1/2000 | Spence et al. |
| 6,240,367 | B1 | 5/2001 | Lin |
| 6,480,784 | B2 | 11/2002 | Mizuno |
| 6,496,117 | B2 | 12/2002 | Gutta et al. |
| 6,502,033 | B1 | 12/2002 | Phuyal |
| 6,502,688 | B1 | 1/2003 | Krooss et al. |
| 6,552,141 | B1 | 4/2003 | Chmelir et al. |
| 6,662,141 | B2 | 12/2003 | Kaub |
| 6,720,920 | B2 | 4/2004 | Breed et al. |
| 6,927,694 | B1 | 8/2005 | Smith et al. |
| 7,085,637 | B2 | 8/2006 | Breed et al. |
| 7,148,913 | B2 | 12/2006 | Keaton et al. |
| 7,177,737 | B2 | 2/2007 | Karlsson et al. |
| 7,195,394 | B2 | 3/2007 | Singh |
| 7,212,651 | B2 | 5/2007 | Viola et al. |
| 7,421,321 | B2 | 9/2008 | Breed et al. |
| 7,423,540 | B2 | 9/2008 | Kisacanin |
| 7,460,940 | B2 | 12/2008 | Larsson et al. |
| 7,471,929 | B2 | 12/2008 | Fujioka et al. |
| 7,502,677 | B2 | 3/2009 | Weichenberger et al. |
| 7,502,688 | B2 | 3/2009 | Hirokawa |
| 7,551,093 | B2 | 6/2009 | Maass |
| 7,558,672 | B2 | 7/2009 | Egami et al. |
| 7,639,148 | B2 | 12/2009 | Victor |
| 7,646,922 | B2 | 1/2010 | Au et al. |
| 7,844,077 | B2 | 11/2010 | Kochi et al. |
| 7,853,072 | B2 | 12/2010 | Han et al. |
| 7,868,821 | B2 | 1/2011 | Hoshizaki |
| 7,912,288 | B2 | 3/2011 | Winn et al. |
| 7,954,587 | B2 | 6/2011 | Kisanuki et al. |
| 7,974,748 | B2 | 7/2011 | Goerick et al. |
| 8,022,831 | B1 | 9/2011 | Wood-Eyre |
| 8,073,287 | B1 | 12/2011 | Wechsler et al. |
| 8,114,568 | B2 | 2/2012 | Van et al. |
| 8,144,542 | B2 | 3/2012 | Na |
| 8,174,568 | B2 | 5/2012 | Samarasekera et al. |
| 8,195,394 | B1 | 6/2012 | Zhu et al. |
| 8,254,670 | B2 | 8/2012 | Prokhorov et al. |
| 8,266,132 | B2 | 9/2012 | Ofek et al. |
| 8,301,344 | B2 | 10/2012 | Simon et al. |
| 8,301,374 | B2 * | 10/2012 | Surampudi ............. G01C 21/30 701/438 |
| 8,344,849 | B2 | 1/2013 | Larsson et al. |
| 8,369,608 | B2 | 2/2013 | Gunaratne |
| 8,441,519 | B2 | 5/2013 | Oshima et al. |
| 8,442,791 | B2 | 5/2013 | Stahlin et al. |
| 8,447,519 | B2 | 5/2013 | Basnayake et al. |
| 8,487,775 | B2 | 7/2013 | Victor et al. |
| 8,498,813 | B2 | 7/2013 | Oohashi et al. |
| 8,502,860 | B2 | 8/2013 | Demirdjian |
| 8,510,196 | B1 | 8/2013 | Brandmaier et al. |
| 8,594,920 | B2 | 11/2013 | Shida |
| 8,606,492 | B1 | 12/2013 | Botnen |
| 8,619,135 | B2 | 12/2013 | Shellshear et al. |
| 8,654,151 | B2 | 2/2014 | Kim |
| 8,666,644 | B2 | 3/2014 | Goto |
| 8,676,498 | B2 | 3/2014 | Ma et al. |
| 8,744,642 | B2 | 6/2014 | Nemat-Nasser et al. |
| 8,761,439 | B1 | 6/2014 | Kumar et al. |
| 8,799,034 | B1 | 8/2014 | Brandmaier et al. |
| 8,805,707 | B2 | 8/2014 | Schumann, Jr. et al. |
| 8,854,199 | B2 | 10/2014 | Cook et al. |
| 8,934,709 | B2 | 1/2015 | Saptharishi et al. |
| 8,952,819 | B2 | 2/2015 | Nemat-Nasser |
| 9,019,571 | B2 | 4/2015 | Yamada |
| 9,053,554 | B2 | 6/2015 | Uchida et al. |
| 9,079,571 | B2 | 7/2015 | Trost et al. |
| 9,081,650 | B1 | 7/2015 | Brinkmann et al. |
| 9,111,147 | B2 | 8/2015 | Thornton et al. |
| 9,121,713 | B2 | 9/2015 | Samarasekera et al. |
| 9,146,558 | B2 | 9/2015 | Field et al. |
| 9,158,962 | B1 | 10/2015 | Nemat-Nasser |
| 9,180,887 | B2 | 11/2015 | Nemat-Nasser et al. |
| 9,201,424 | B1 | 12/2015 | Ogale |
| 9,201,932 | B2 | 12/2015 | Silver et al. |
| 9,218,003 | B2 | 12/2015 | Fong et al. |
| 9,235,750 | B1 | 1/2016 | Sutton et al. |
| 9,305,214 | B1 | 4/2016 | Young et al. |
| 9,327,743 | B2 | 5/2016 | Green et al. |
| 9,330,571 | B2 | 5/2016 | Ferguson et al. |
| 9,349,113 | B2 | 5/2016 | Bashkin |
| 9,358,976 | B2 | 6/2016 | Stierlin |
| 9,412,102 | B2 | 8/2016 | Wolf et al. |
| 9,429,439 | B2 | 8/2016 | Stomper |
| 9,439,036 | B2 | 9/2016 | Spears et al. |
| 9,443,309 | B2 | 9/2016 | Menashe et al. |
| 9,465,978 | B2 | 10/2016 | Hachisuka et al. |
| 9,472,102 | B2 | 10/2016 | McClain et al. |
| 9,491,374 | B1 | 11/2016 | Avrahami et al. |
| 9,514,626 | B2 | 12/2016 | Wu et al. |
| 9,535,878 | B1 | 1/2017 | Brinkmann et al. |
| 9,573,541 | B2 | 2/2017 | Graumann et al. |
| 9,679,480 | B2 | 6/2017 | Hakeem |
| 9,688,150 | B2 | 6/2017 | Seong et al. |
| 9,701,307 | B1 | 7/2017 | Newman et al. |
| 9,709,986 | B2 * | 7/2017 | Gdalyahu .............. G01C 21/34 |
| 9,718,468 | B2 | 8/2017 | Barfield et al. |

(56) References Cited

U.S. PATENT DOCUMENTS

| | | |
|---|---|---|
| 9,731,727 B2 | 8/2017 | Heim et al. |
| 9,734,414 B2 | 8/2017 | Samarasekera et al. |
| 9,734,455 B2 | 8/2017 | Levinson et al. |
| 9,760,090 B2* | 9/2017 | Shashua .............. B62D 15/025 |
| 9,767,625 B1 | 9/2017 | Snyder et al. |
| 9,812,016 B2 | 11/2017 | Oremus |
| 9,834,153 B2* | 12/2017 | Gupta ..................... B60R 11/04 |
| 9,845,097 B2 | 12/2017 | Prakah-Asante et al. |
| 9,851,214 B1 | 12/2017 | Chintakindi |
| 9,852,019 B2 | 12/2017 | Ashani |
| 9,881,218 B2 | 1/2018 | Ogata et al. |
| 9,892,558 B2 | 2/2018 | Troy et al. |
| 9,928,432 B1 | 3/2018 | Sathyanarayana et al. |
| 9,977,973 B2 | 5/2018 | Okuda et al. |
| 10,078,333 B1 | 9/2018 | Bajracharya |
| 10,248,124 B2* | 4/2019 | Bellaiche ................. G06T 7/74 |
| 10,365,658 B2* | 7/2019 | Fridman ............. G05D 1/0221 |
| 2001/0018636 A1* | 8/2001 | Mizuno ................. G01C 21/26 701/518 |
| 2002/0082806 A1 | 6/2002 | Kaub |
| 2002/0140562 A1 | 10/2002 | Gutta et al. |
| 2002/0198632 A1* | 12/2002 | Breed ..................... G08G 1/164 701/1 |
| 2003/0095140 A1 | 5/2003 | Keaton et al. |
| 2003/0169907 A1 | 9/2003 | Edwards et al. |
| 2004/0051659 A1 | 3/2004 | Garrison |
| 2004/0167667 A1 | 8/2004 | Goncalves et al. |
| 2004/0168148 A1 | 8/2004 | Goncalves et al. |
| 2004/0258307 A1 | 12/2004 | Viola et al. |
| 2005/0002558 A1 | 1/2005 | Franke et al. |
| 2005/0060069 A1 | 3/2005 | Breed et al. |
| 2005/0073136 A1 | 4/2005 | Larsson et al. |
| 2005/0182518 A1 | 8/2005 | Karlsson |
| 2005/0234679 A1 | 10/2005 | Karlsson |
| 2005/0273218 A1 | 12/2005 | Breed et al. |
| 2005/0273263 A1 | 12/2005 | Egami et al. |
| 2006/0106534 A1 | 5/2006 | Kawamata et al. |
| 2006/0186702 A1 | 8/2006 | Kisanuki et al. |
| 2006/0187305 A1 | 8/2006 | Trivedi et al. |
| 2006/0247847 A1 | 11/2006 | Carter et al. |
| 2006/0271287 A1 | 11/2006 | Gold et al. |
| 2007/0043491 A1 | 2/2007 | Goerick et al. |
| 2007/0050108 A1 | 3/2007 | Larschan et al. |
| 2007/0063855 A1 | 3/2007 | Maass |
| 2007/0100669 A1 | 5/2007 | Wargin et al. |
| 2007/0120948 A1 | 5/2007 | Fujioka et al. |
| 2007/0152433 A1 | 7/2007 | Weichenberger et al. |
| 2007/0154063 A1 | 7/2007 | Breed |
| 2007/0154100 A1 | 7/2007 | Au et al. |
| 2007/0159344 A1 | 7/2007 | Kisacanin |
| 2007/0244640 A1 | 10/2007 | Hirokawa |
| 2007/0263901 A1 | 11/2007 | Wu et al. |
| 2007/0280505 A1 | 12/2007 | Breed |
| 2008/0025568 A1 | 1/2008 | Han et al. |
| 2008/0075367 A1 | 3/2008 | Winn et al. |
| 2008/0084283 A1 | 4/2008 | Kalik |
| 2008/0167814 A1 | 7/2008 | Samarasekera et al. |
| 2008/0243378 A1 | 10/2008 | Zavoli |
| 2008/0252412 A1 | 10/2008 | Larsson et al. |
| 2008/0260207 A1 | 10/2008 | Nagaoka et al. |
| 2009/0080697 A1 | 3/2009 | Kishikawa et al. |
| 2009/0175498 A1 | 7/2009 | Kochi et al. |
| 2009/0228204 A1 | 9/2009 | Zavoli et al. |
| 2009/0244291 A1 | 10/2009 | Saptharishi et al. |
| 2009/0261979 A1 | 10/2009 | Breed et al. |
| 2010/0061591 A1 | 3/2010 | Okada et al. |
| 2010/0169013 A1 | 7/2010 | Nakamura et al. |
| 2010/0176987 A1 | 7/2010 | Hoshizaki |
| 2010/0209881 A1 | 8/2010 | Lin et al. |
| 2010/0209891 A1 | 8/2010 | Lin et al. |
| 2010/0215254 A1 | 8/2010 | Prokhorov |
| 2010/0217524 A1 | 8/2010 | Oohashi et al. |
| 2010/0220008 A1* | 9/2010 | Conover ................. G01S 1/245 342/357.29 |
| 2010/0225665 A1 | 9/2010 | Ofek et al. |
| 2010/0238009 A1 | 9/2010 | Cook et al. |
| 2010/0295948 A1* | 11/2010 | Xie .......................... G06T 7/80 348/175 |
| 2010/0312745 A1 | 12/2010 | Tabak |
| 2010/0322507 A1 | 12/2010 | Gunaratne |
| 2011/0128374 A1 | 6/2011 | Shellshear et al. |
| 2011/0137527 A1 | 6/2011 | Simon et al. |
| 2011/0245993 A1 | 10/2011 | Goto |
| 2011/0262004 A1 | 10/2011 | Murakami |
| 2011/0301779 A1 | 12/2011 | Shida |
| 2011/0316980 A1 | 12/2011 | Dubbleman et al. |
| 2012/0027258 A1 | 2/2012 | Uchida et al. |
| 2012/0078510 A1 | 3/2012 | Ma et al. |
| 2012/0109517 A1* | 5/2012 | Watanabe ............... G01S 19/49 701/431 |
| 2012/0116676 A1 | 5/2012 | Basnayake et al. |
| 2012/0121161 A1 | 5/2012 | Eade et al. |
| 2012/0122486 A1 | 5/2012 | Day et al. |
| 2012/0123806 A1 | 5/2012 | Schumann et al. |
| 2012/0154425 A1 | 6/2012 | Kim |
| 2012/0185091 A1 | 7/2012 | Field et al. |
| 2012/0197519 A1 | 8/2012 | Richardson |
| 2012/0206596 A1 | 8/2012 | Samarasekera et al. |
| 2012/0263346 A1 | 10/2012 | Datta et al. |
| 2013/0073114 A1 | 3/2013 | Nemat-Nasser et al. |
| 2013/0093886 A1 | 4/2013 | Rothschild |
| 2013/0107038 A1* | 5/2013 | Ota ........................ G01C 21/20 348/135 |
| 2013/0142390 A1 | 6/2013 | Othmezouri et al. |
| 2013/0147661 A1 | 6/2013 | Kangas et al. |
| 2013/0155229 A1 | 6/2013 | Thornton et al. |
| 2013/0194127 A1 | 8/2013 | Ishihara et al. |
| 2013/0211687 A1 | 8/2013 | Trost et al. |
| 2014/0037138 A1 | 2/2014 | Sato et al. |
| 2014/0049601 A1 | 2/2014 | Pfeil |
| 2014/0139655 A1 | 5/2014 | Mimar |
| 2014/0195477 A1 | 7/2014 | Graumann et al. |
| 2014/0210625 A1 | 7/2014 | Nemat-Nasser |
| 2014/0210978 A1 | 7/2014 | Gunaratne et al. |
| 2014/0213300 A1 | 7/2014 | Spears et al. |
| 2014/0214255 A1 | 7/2014 | Dolgov et al. |
| 2014/0222280 A1 | 8/2014 | Salomonsson et al. |
| 2014/0253375 A1* | 9/2014 | Rudow ................. G01S 19/49 342/357.51 |
| 2014/0267703 A1 | 9/2014 | Taylor et al. |
| 2014/0300739 A1 | 10/2014 | Mimar |
| 2014/0324281 A1 | 10/2014 | Nemat-Nasser et al. |
| 2014/0324310 A1* | 10/2014 | Kobayashi ........... B62D 15/027 701/70 |
| 2014/0379233 A1 | 12/2014 | Chundrlik, Jr. et al. |
| 2014/0379254 A1* | 12/2014 | Miksa ................. G01C 21/3811 701/450 |
| 2015/0025917 A1 | 1/2015 | Stempora |
| 2015/0049193 A1* | 2/2015 | Gupta .................... G03B 43/00 348/148 |
| 2015/0049195 A1 | 2/2015 | Ishigaki et al. |
| 2015/0078632 A1 | 3/2015 | Hachisuka et al. |
| 2015/0084757 A1 | 3/2015 | Annibale et al. |
| 2015/0086078 A1 | 3/2015 | Sibiryakov |
| 2015/0110344 A1 | 4/2015 | Okumura et al. |
| 2015/0140991 A1 | 5/2015 | Silver et al. |
| 2015/0154845 A1 | 6/2015 | Wu et al. |
| 2015/0161892 A1 | 6/2015 | Oremus |
| 2015/0219462 A1 | 8/2015 | Stmper |
| 2015/0221136 A1 | 8/2015 | Shaburova et al. |
| 2015/0228077 A1 | 8/2015 | Menashe et al. |
| 2015/0239482 A1 | 8/2015 | Green et al. |
| 2015/0254603 A1 | 9/2015 | Bashkin |
| 2015/0269438 A1 | 9/2015 | Samarasekera et al. |
| 2015/0274161 A1 | 10/2015 | Stierlin |
| 2015/0294422 A1 | 10/2015 | Carver et al. |
| 2015/0344030 A1 | 12/2015 | Damerow et al. |
| 2015/0375756 A1 | 12/2015 | Do et al. |
| 2015/0379715 A1 | 12/2015 | Chandrasekar et al. |
| 2016/0063341 A1 | 3/2016 | Ogata et al. |
| 2016/0063761 A1 | 3/2016 | Sisbot et al. |
| 2016/0078303 A1 | 3/2016 | Samarasekera et al. |
| 2016/0086021 A1 | 3/2016 | Grohman et al. |
| 2016/0139977 A1 | 5/2016 | Ashani |

(56) References Cited

U.S. PATENT DOCUMENTS

| | | |
|---|---|---|
| 2016/0147230 A1 | 5/2016 | Munich et al. |
| 2016/0163198 A1 | 6/2016 | Dougherty |
| 2016/0169690 A1 | 6/2016 | Bogovich et al. |
| 2016/0203373 A1 | 7/2016 | Menashe et al. |
| 2016/0209511 A1 | 7/2016 | Dolinar et al. |
| 2016/0244022 A1 | 8/2016 | Lippman et al. |
| 2016/0253806 A1 | 9/2016 | Iimura |
| 2016/0253886 A1 | 9/2016 | Buchholz et al. |
| 2016/0267335 A1 | 9/2016 | Hampiholi |
| 2016/0284078 A1 | 9/2016 | Kim et al. |
| 2016/0297365 A1 | 10/2016 | Nix |
| 2016/0297449 A1 | 10/2016 | Heim et al. |
| 2016/0300242 A1 | 10/2016 | Truong et al. |
| 2016/0305794 A1 | 10/2016 | Horita et al. |
| 2016/0335475 A1 | 11/2016 | Krenzer et al. |
| 2016/0339782 A1 | 11/2016 | Seong et al. |
| 2017/0008521 A1* | 1/2017 | Braunstein ......... G06K 9/00791 |
| 2017/0011529 A1 | 1/2017 | Urashita |
| 2017/0039848 A1 | 2/2017 | Hakeem |
| 2017/0039850 A1 | 2/2017 | Vanden Berg et al. |
| 2017/0043781 A1 | 2/2017 | Prakah-Asante et al. |
| 2017/0048239 A1 | 2/2017 | Jeon et al. |
| 2017/0053167 A1 | 2/2017 | Ren et al. |
| 2017/0053555 A1 | 2/2017 | Angel et al. |
| 2017/0055868 A1 | 3/2017 | Hatakeyama |
| 2017/0061222 A1 | 3/2017 | Hoye et al. |
| 2017/0064363 A1 | 3/2017 | Wexler et al. |
| 2017/0074659 A1* | 3/2017 | Giurgiu ................. G01S 19/071 |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0098131 A1 | 4/2017 | Shashua et al. |
| 2017/0101093 A1 | 4/2017 | Barfield et al. |
| 2017/0106869 A1 | 4/2017 | Lavoie et al. |
| 2017/0109828 A1 | 4/2017 | Pierce et al. |
| 2017/0113664 A1 | 4/2017 | Nix |
| 2017/0124476 A1* | 5/2017 | Levinson ............... G01S 17/931 |
| 2017/0140231 A1 | 5/2017 | Chen et al. |
| 2017/0146801 A1 | 5/2017 | Stempora |
| 2017/0178352 A1 | 6/2017 | Harmsen et al. |
| 2017/0200061 A1 | 7/2017 | Julian et al. |
| 2017/0221149 A1 | 8/2017 | Hsu-Hoffman et al. |
| 2017/0243399 A1 | 8/2017 | Troy et al. |
| 2017/0248952 A1 | 8/2017 | Perkins et al. |
| 2017/0253236 A1 | 9/2017 | Hayakawa |
| 2017/0287163 A1 | 10/2017 | Kaufmann et al. |
| 2017/0292848 A1 | 10/2017 | Nepomuceno et al. |
| 2017/0293819 A1 | 10/2017 | Deng |
| 2017/0309072 A1 | 10/2017 | Li et al. |
| 2017/0314954 A1 | 11/2017 | Golding et al. |
| 2017/0345161 A1 | 11/2017 | Takantani et al. |
| 2017/0357861 A1 | 12/2017 | Okuda et al. |
| 2018/0012085 A1 | 1/2018 | Blayvas et al. |
| 2018/0023960 A1* | 1/2018 | Fridman .............. G05D 1/0246 382/104 |
| 2018/0023961 A1* | 1/2018 | Fridman .......... G08G 1/096725 382/104 |
| 2018/0024562 A1* | 1/2018 | Bellaiche .................. G06T 7/73 701/26 |
| 2018/0024565 A1* | 1/2018 | Fridman .............. G05D 1/0274 701/26 |
| 2018/0024568 A1* | 1/2018 | Fridman ............ G01C 21/3822 701/28 |
| 2018/0025235 A1* | 1/2018 | Fridman .................. G06T 7/337 382/103 |
| 2018/0039862 A1 | 2/2018 | Hyatt et al. |
| 2018/0043829 A1 | 2/2018 | Cordell et al. |
| 2018/0045519 A1 | 2/2018 | Ghadiok et al. |
| 2018/0052515 A1 | 2/2018 | Wanner et al. |
| 2018/0075309 A1 | 3/2018 | Sathyanarayana et al. |
| 2018/0087907 A1* | 3/2018 | DeBitetto ............... G01C 21/30 |
| 2018/0107882 A1 | 4/2018 | Ogata et al. |
| 2018/0115711 A1 | 4/2018 | Kato et al. |
| 2018/0120122 A1* | 5/2018 | Laine ................. G01C 21/3647 |
| 2018/0172454 A1 | 6/2018 | Ghadiok et al. |
| 2018/0176173 A1 | 6/2018 | Keysers et al. |
| 2018/0186366 A1 | 7/2018 | Gordon et al. |
| 2018/0188380 A1* | 7/2018 | Venkatraman ........ G01S 19/396 |
| 2018/0204111 A1 | 7/2018 | Zadeh et al. |
| 2018/0229770 A1 | 8/2018 | Kataoka et al. |
| 2018/0232583 A1 | 8/2018 | Wang et al. |
| 2018/0239144 A1 | 8/2018 | Woods et al. |
| 2018/0259353 A1 | 9/2018 | Tsurumi et al. |
| 2018/0292212 A1* | 10/2018 | Bobye .................... G01C 21/18 |
| 2019/0072391 A1* | 3/2019 | Kitano .................... G01P 13/02 |
| 2019/0384294 A1* | 12/2019 | Shashua ............... G05D 1/0088 |
| 2020/0124421 A1* | 4/2020 | Kang .................... G01C 21/165 |
| 2020/0158509 A1* | 5/2020 | McIntire .................. G01C 3/06 |
| 2020/0217667 A1* | 7/2020 | Kim .......................... G06T 7/74 |

FOREIGN PATENT DOCUMENTS

| | | |
|---|---|---|
| DE | 10 2009 045326 | 4/2011 |
| DE | 102009045326 A1 | 4/2011 |
| EP | 3057061 B1 | 8/2017 |
| GB | 2506365 A | 4/2014 |
| JP | 2005-026549 | 1/2005 |
| JP | 2011-252833 | 12/2011 |
| JP | 2015-108604 | 6/2015 |
| WO | 2015184578 A1 | 12/2015 |
| WO | 135561 | 9/2016 |
| WO | 2016135561 A1 | 9/2016 |
| WO | WO 135561 | 9/2016 |
| WO | 2016179303 A1 | 11/2016 |
| WO | 2018039560 A1 | 3/2018 |

OTHER PUBLICATIONS

Guo Feng: et al. "Task 3-Evaluating the Relationship Between Near-Crashes and Crashes: Can Near-Crashes Serve as a Surrogate Safety Metric for Crashes?" Virginia Tech Transportation Institute, U.S. Department of Transportation, Sep. 2010., Nov. 6, 2017.

Wei, Lijun , et al., "GPS and Stereovision-Based Visual Odometry: Application to Urban Scene Mapping and Intelligent Vehicle Localization", International Journal of Vehicular Technology, vol. 24, No. 5, Article ID 439074, 17 pages., Jan. 11, 2011.

Non-Final Office Action for U.S. Appl. No. 15/673,098 dated May 3, 2018.

Amendment Response to NFOA for U.S. Appl. No. 15/673,098 dated Aug. 8, 2018.

Notice of Allowance for U.S. Appl. No. 15/673,098 dated Oct. 3, 2018.

Non-Final Office Action for U.S. Appl. No. 15/897,901 dated May 3, 2018.

Amendment Response to NFOA for U.S. Appl. No. 15/897,901 dated Aug. 8, 2018.

Notice of Allowance for U.S. Appl. No. 15/897,901 dated Oct. 3, 2018.

Notice of Allowance for U.S. Appl. No. 15/897,901 dated Jan. 7, 2019.

International Search Report for PCT International Appln. No. PCT/US17/46134 dated Oct. 19, 2017.

Written Opinion for PCT International Appln. No. PCT/US17/46134 dated Oct. 19, 2017.

International Preliminary Report on Patentability for PCT International Appln. No. PCT/US17/46134 dated Feb. 12, 2019.

Foreign OA for JP Patent Appln. No. 2019-506506 dated May 19, 2020.

English Summary of Japanese Office Action dated May 19, 2020 for Japanese patent application No. 2019-506506.

European Search Report for EP Patent Appln. No. 17840221.0 dated Jun. 26, 2020.

* cited by examiner

S100, S200, S300, S510

SYSTEM AND METHOD FOR PRECISION LOCALIZATION AND MAPPING

CROSS-REFERENCE TO RELATED APPLICATIONS

This application is a continuation application of U.S. application Ser. No. 15/673,098, filed 9 Aug. 2017, which claims the benefit of U.S. Provisional Application Ser. No. 62/492,790, filed 1 May 2017, and U.S. Provisional Application Ser. No. 62/372,633, filed 9 Aug. 2016, each of which is incorporated herein in its entirety by this reference.

TECHNICAL FIELD

This invention relates generally to the mapping field, and more specifically to a new and useful system and method for precision localization in the mapping field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
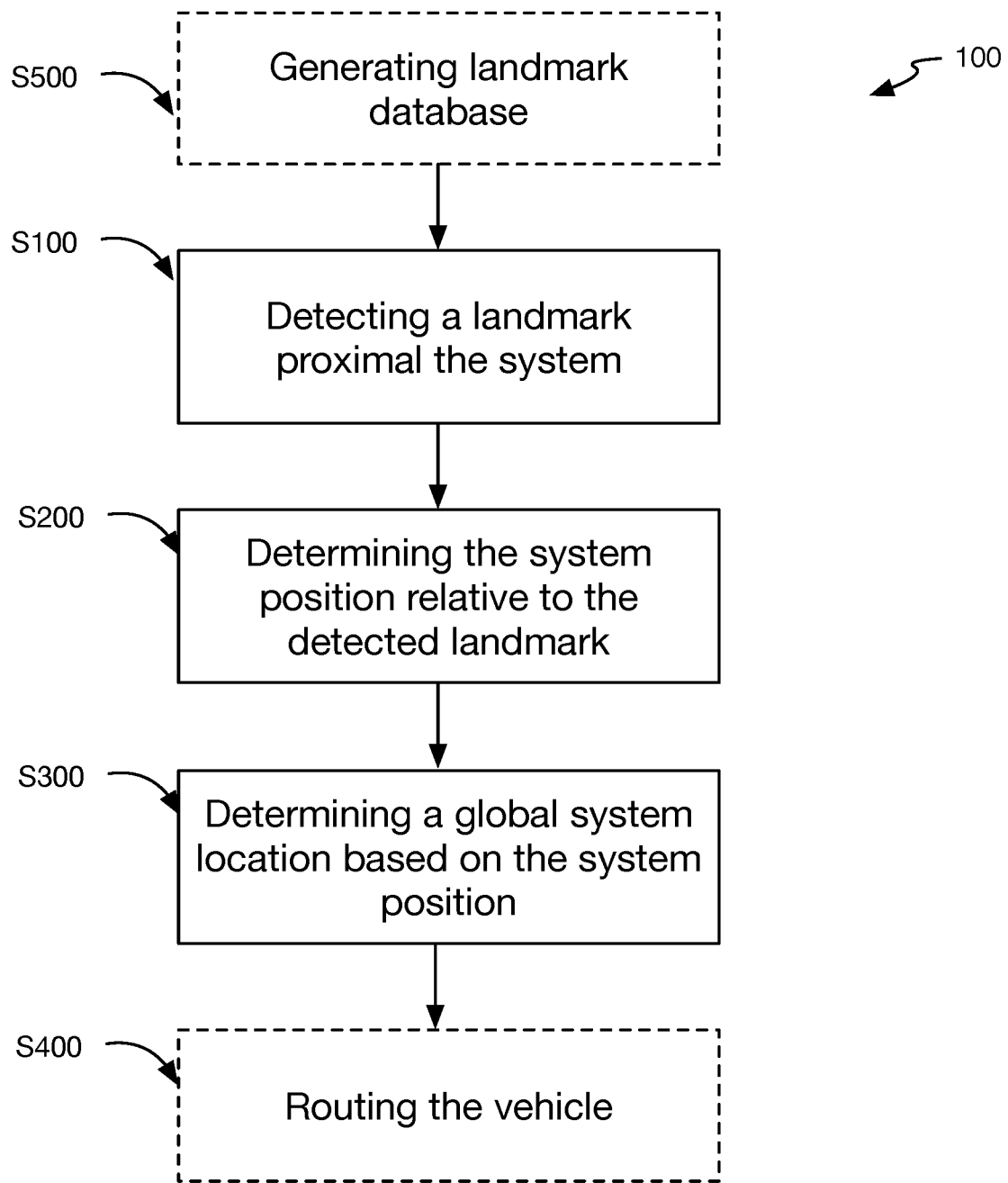
FIG. 1 is a schematic representation of the method for precision localization.
Figure 8:
FIGS. 8 and 9 are examples of building a real-time map based on the determined position and/or detected landmarks.

As shown in FIG. 1, the method 100 for precision localization includes: detecting a landmark proximal the vehicle; determining the vehicle position relative to the detected landmark; and determining a global system location based on the vehicle position relative to the detected landmark. The method functions to determine a precise geographic location for the system 200. This high-precision system location can be used to minimize scale ambiguity and drift in the location provided by secondary location systems (e.g., GPS), used for precise data logging, navigation, real-time map updates (examples shown in FIGS. 8 and 9), or for any other suitable purpose.

The method is preferably performed while the vehicle is traversing a physical space (e.g., outside, on roads, in tunnels, through airspace, etc.), but can additionally or alternatively be performed when the vehicle is not moving (e.g., parked) or operating in any other suitable mode. The method can be performed at a predetermined frequency, in response to a localization error (e.g., estimated, calculated) exceeding a threshold value, in response to trigger event occurrence (e.g., system location within a predetermined geofence), or at any other suitable time.

Figure 2:
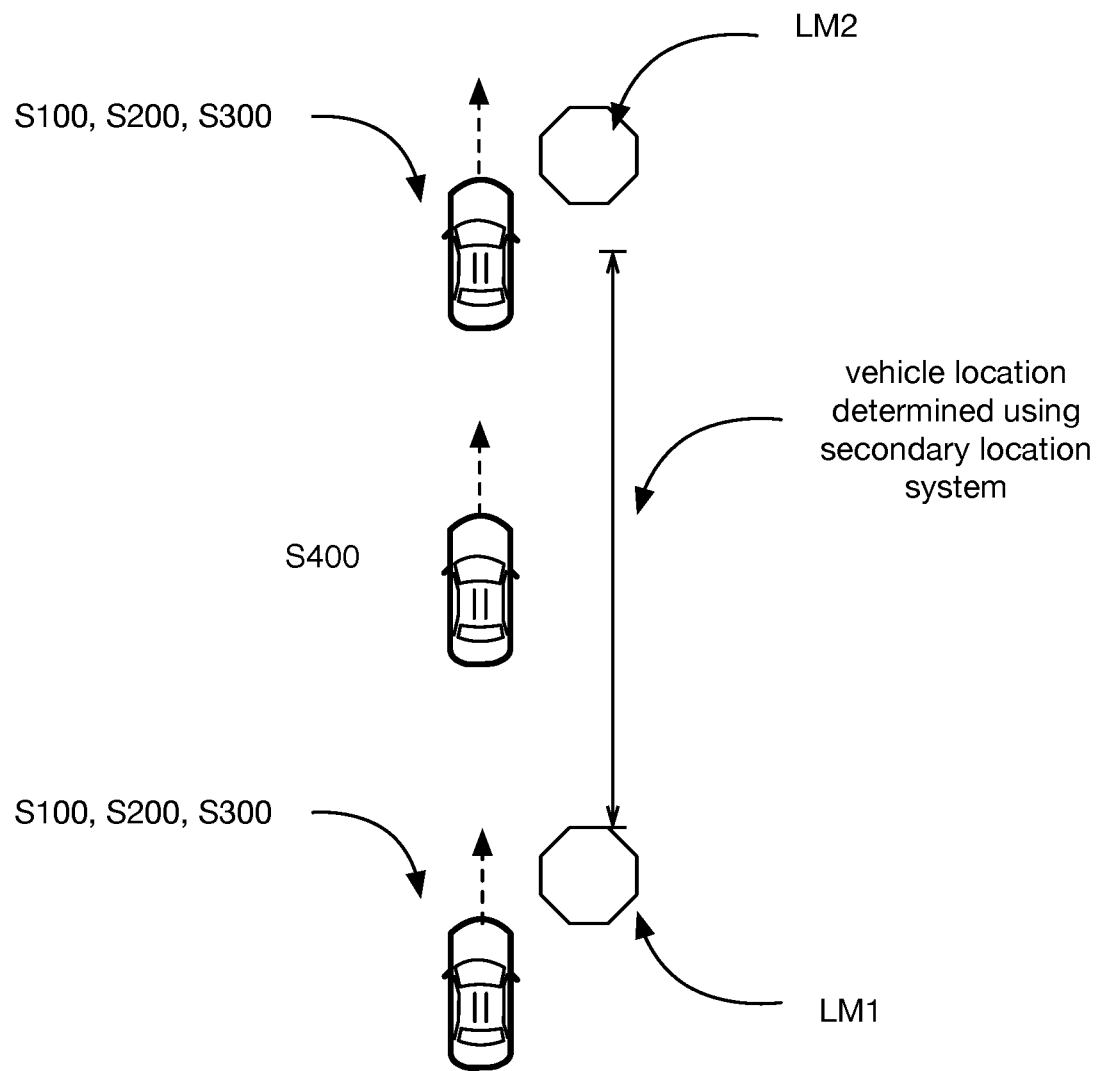
FIG. 2 is an example of method application.

In one example application (specific example shown in FIG. 2), a vehicle uses location estimates provided by a secondary location system while traversing (e.g., associates the location estimates with auxiliary sampled signals), and performs the method to determine a higher accuracy and/or precise location when a landmark is detected in close proximity. The precise system location can be determined to sub-meter accuracy (e.g., 1-sigma, 2-sigma, 3-sigma sub-meter accuracy, etc.), sub-0.5 m accuracy (e.g., 1-sigma, 2-sigma, 3-sigma sub-0.5 m accuracy, etc.), or any other suitable accuracy and/or precision. The location estimates can be provided by on-board global navigation systems (e.g., low-resolution GPS systems), dead-reckoning systems, or any other suitable secondary location system. When global navigation locations are used, the high-precision location can be used to refine the concurrently recorded and/or previously determined location estimates. When dead-reckoning systems are used, the high-precision location can be used to correct or eliminate drift (e.g., location error) and/or reset the reference point for the dead-reckoning system (e.g., reset the location error, set the location error to a zero value or another suitable value, etc.). The precise location determination and/or location estimate correction can be performed: when the vehicle is within a predetermined distance of the landmark, when the landmark is detected, in real time, when the location error has exceeded and/or met a threshold value, or at any other suitable time. The location estimate correction factor can optionally be stored in association with the location estimate, and be used to correct other vehicle locations for comparable location estimates (e.g., for the same location estimate, same secondary location system, etc.).

In a second example application, the method can provide precise system locations for dense urban areas, areas with poor GPS coverage, or in cases where algorithms, such as lane detection on highways, cannot be used (e.g., when lane lines are absent).

In a third example application, the method can provide highly precise, real-time, maps and/or map updates, such as intersection information (e.g., congestion, light status, lane transitions, etc.), construction, traffic information, changes in the proximal environment, or any other suitable information. This real- or near-real time information can be used for: automated driving applications, to build a 3-D model of the region surrounding the vehicle (and/or a global model, if data from multiple vehicle systems are aggregated), as simulation data for autonomous vehicle training, to search the physical world (e.g., for a given license plate number), or for any other suitable purpose.

2. Benefits

The system and method, and/or variants thereof, can confer several benefits.

First, the system and method functions to determine precise locations in-situ (e.g., while the vehicle is traversing). This can function to provide more accurate sensor measurement location correlations, autonomous navigation (e.g., based on the precise location, based on the landmarks), on-the-fly camera intrinsics calibration (e.g., calibration of camera focal length, principal point, etc. based on known fiducial dimensions), and/or provide any other suitable benefit from having precise locations in real- or near-real time.

Second, the system and method can provide consistent estimation of landmarks (e.g., fiducials in the vehicle environment) by using appropriate linearization, feature/state parameterization, and/or other methods. In one variation, the method can apply computer vision methods, such as edge detection, contouring, line fitting, model fitting, and/or deep learning methods to eliminate false positives in fiducial detection.

Third, because the system and method references a set of landmark maps, the system and method can further function to detect changes in the environment (e.g., by comparing detected landmarks with expected landmarks). These changes can subsequently be interpreted for auxiliary vehicle routing, maintenance notification, and/or for any other suitable purpose.

Fourth, the determined precise location can be used to estimate and/or correct the location estimates for secondary vehicles in the same area. For example, secondary vehicles sharing a parameter with the vehicle (e.g., same or similar GPS location pattern, inaccuracy pattern, context, secondary location system, route, etc.) can use the correction factors determined by the primary vehicle. In a second example, the primary vehicle precise location can be communicated to a proximal secondary vehicle (e.g., following the primary vehicle, approaching the primary vehicle, etc.), wherein the secondary vehicle can determine the secondary vehicle's precise location based on the primary vehicle's location and a measured distance between the secondary and primary vehicle (e.g., measured using LIDAR, TOF, sonar, radar, ultrasound, or other distance system, etc.). However, the determined precise location can be otherwise used.

Fifth, variants of the system and method may function to distribute computation between systems at the vehicle and systems located remotely in order to improve overall system performance and behavior. For example, the system at a primary vehicle can identify landmarks (e.g., and generate landmark data that enables the landmark to be re-identified) and associate the landmarks with geographic locations, and store the landmark data and the associated geographic locations at a remote database, to enable other vehicles and/or the same vehicles to retrieve the landmark data and thereby determine the global system location of the system at the vehicle (e.g., the primary vehicle, a second vehicle, etc.).

Sixth, variants of the method can improve the operation of physical systems (e.g., hardware). For example, generating and/or utilizing a real-time image-based map of fiducial landmarks can improve the navigation, localization, and/or mapping capability of an autonomous and/or semi-autonomous vehicle. In another example, variants of the method can improve the performance of autonomous vehicles controlled via image-based computer vision and machine learning models, by improving the training and performance of these models. In another example, variants of the method can improve the performance of in-vehicle hardware with integrated computational modules (e.g., system-on-chip computer vision systems), by reducing the computational load of processors, enabling lower power operation, and similar improvements.

Seventh, variants of the system and method can solve problems arising from the use of computerized technology and rooted in computer and machine technology. For example, system localization that includes dead-reckoning, a computerized technology, can be susceptible to localization errors (e.g., location error, drift error, etc.), which can be reduced via landmark recognition, identification, and analysis in accordance with variants of the system and/or method. In another example, variants of the method can enable the training of vehicle control models based on supervised learning (e.g., detecting expert driving behavior at a vehicle system, recording image data associated with the expert driving behavior, and training an image-based control model using the recorded image data associated with the expert driving behavior).

However, the system and method and/or variants thereof can confer any other suitable benefits and/or advantages.

3. System.

Figure 10:
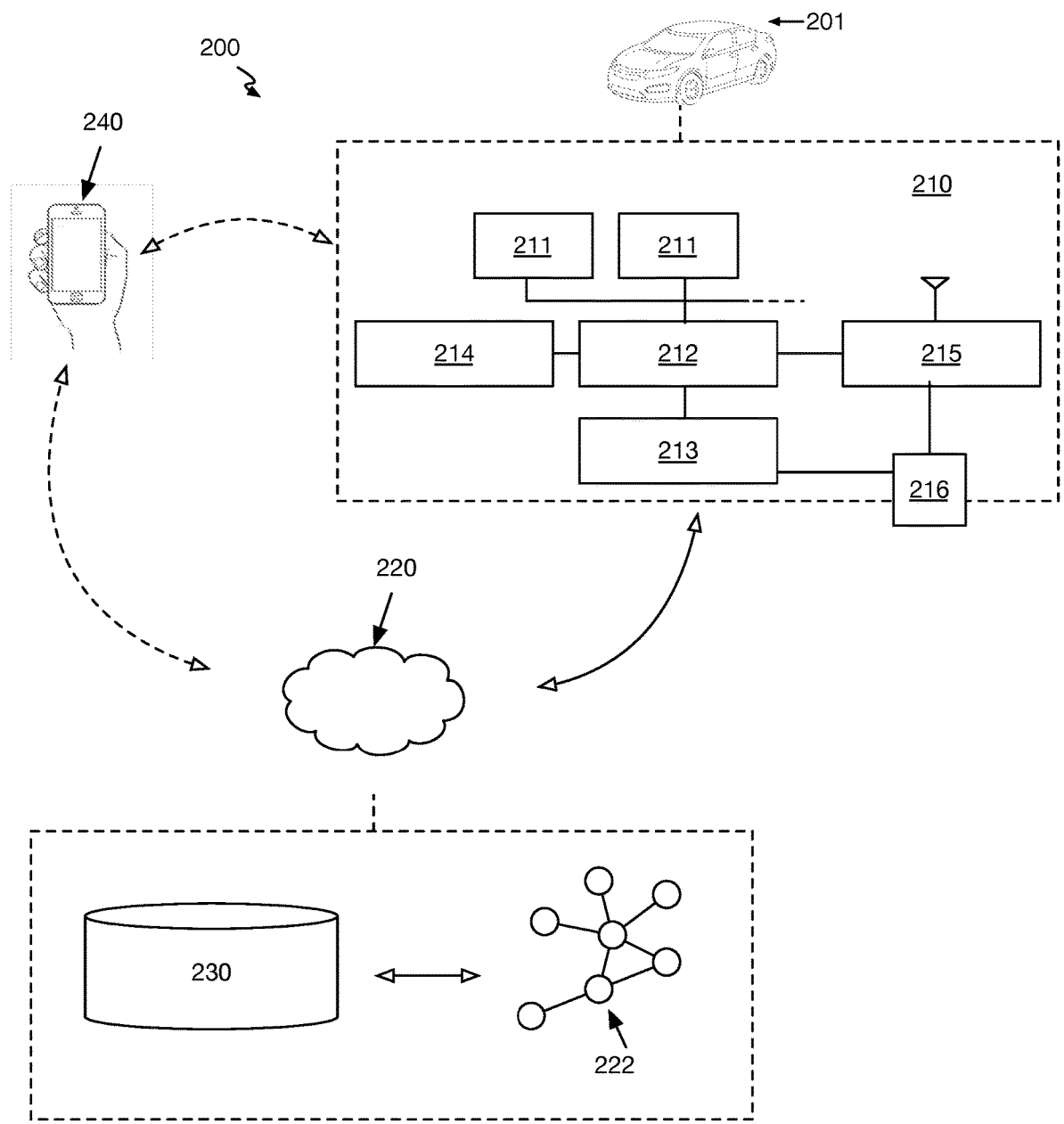
FIG. 10 is a schematic representation of an example embodiment of the precision localization and mapping system.

The method is preferably performed with a precision localization system 200. As shown in FIG. 10, the precision localization system preferably includes: a vehicle 201 with a sensor system 210, a signal analysis system, and a landmark database 230, but can additionally or alternatively include any other suitable component. The signal analysis system, a landmark database, and/or other processing modules 222 can be stored and/or run on the vehicle 201, the sensor system 210, a remote computing system 220 (e.g., server system), a mobile device 240 associated with the vehicle and/or a user of the vehicle, auxiliary vehicles, the landmarks themselves (e.g., by a beacon system attached to the landmark), a distributed system, and/or any other suitable computing system.

In one variation, a main processing module is stored and/or maintained (e.g., generated, calibrated, etc.) by the remote computing system, and a local version (e.g., smaller version, simplified version) is stored on the vehicle. In a second variation, the system includes multiple variants of a processing module (e.g., differentiated by operation context, such as ambient light availability, fiducial density, fiducial number, fiducial size, vehicle velocity, vehicle acceleration, vehicle location, time of day, or other context parameter), wherein the system automatically selects and runs a processing module variant based on the current operation context. In this variation, the processing module variants can be stored on the vehicle, by the remote computing system (e.g., wherein contextual operation data can be transmitted from the vehicle to the remote system, and the module selection and/or module itself returned from the remote system), and/or be stored by any other suitable system.

The vehicle of the system functions to traverse through a physical space. The vehicle can be autonomous, remote-controlled (e.g., teleoperated), manually driven, a combination of one or more of the above, or otherwise controlled. The vehicle can be a terrestrial, aerial, aquatic, or other vehicle. Examples of the vehicle include: an automobile, a motorcycle, a bicycle, a drone, a helicopter, an airplane, a ship, or any other suitable vehicle. The vehicle can include a motive mechanism (e.g., wheels, drivetrain, motor, etc.), a data communication system (e.g., vehicle data bus, such as a CAN bus), or any other suitable system.

The sensor system of the system functions to sample signals, which can be used to: sample signals indicative of the ambient environment (e.g., images), identify fiducials in the ambient environment (e.g., landmarks, features of landmarks, etc.), and/or used in any other suitable manner. The sensor system is preferably mounted to a known position relative to the vehicle (e.g., wherein the position can be measured, recorded, retrieved, inferred, and/or calibrated during install or during system operation), but can be otherwise mounted to the vehicle. The sensor system components can be mounted within a common or disparate housings. As shown in FIG. 10, the sensor system can include: one or more sensors 211, a landmark detection system 212, a secondary location system 214, an orientation system 213 (e.g., IMU, accelerometer, gyroscope, altimeter, magnetometer, etc.), a vehicle data system 216 (OBD II connector, CAN bus connector, wireless radio), a processing system 215 (e.g., CPU, GPU, TPU, DSP etc.), storage (e.g., Flash, RAM, etc.), a communication subsystem (e.g., a radio, antenna, wireless data link, etc.), or any other suitable subsystem. The sensor(s) can include: auxiliary sensors (e.g., acoustic sensors, optical sensors, such as photodiodes, temperature sensors, pressure sensors, flow sensors, vibration sensors, proximity sensors, chemical sensors, electromagnetic sensors, force sensors, etc.), power (e.g., battery, power connector), or any other suitable type of sensor. The landmark detection system functions to detect the landmark and/or determined landmark parameters. Examples of the landmark detection system include: optical sensor(s) (e.g., monocular camera, stereo camera, multispectral camera, hyperspectral camera, visible range camera, UV camera, IR camera); antenna (e.g., BLE, WiFi, 3G, 4G, 5G, Zigbee, 802.11x, etc.), acoustic sensors (e.g., microphones, speakers), rangefinding systems (e.g., LIDAR, RADAR, sonar, TOF), or any other suitable sensor. The secondary location system functions to determine (e.g., estimate, calculate, measure, receive, etc.) the vehicle location, and can be used in conjunction with and/or in lieu of the precision location system and/or method.

Examples of secondary location systems that can be used include: global navigation systems (e.g., GPS), a cellular tower triangulation system, trilateration system, beacon system, dead-reckoning system (e.g., using the orientation sensors, optical flow, wheel or motor odometry measurements, etc.), or any other suitable location system. In one example, the secondary location system includes a visual-inertial odometry module that applies estimators using iterative-minimization techniques and Kalman/particle filters to the sampled images and inertial measurements. In a specific example, the sensor system includes: a forward-facing camera (e.g., monocular camera), a rear-facing camera (e.g., monocular camera), an orientation sensor, and a secondary location system, all statically mounted within a common housing, where the relative positions of the components (e.g., field of views) are known.

The signal analysis system of the system functions to extract parameters from signals sampled by the sensor system. The signal analysis system can be stored and/or executed on: the vehicle, the sensor system, the remote computing system, a user device removably communicably connected to vehicle and/or sensor system, or any other suitable computing system. The signal analysis system can include one or more processing modules, which can be selectively used based on contextual operation parameters (e.g., location estimate; vehicle operation parameters, such as trajectory, velocity, acceleration, wheel angle; time of day; anticipated or current weather; ambient light; ambient wind; positional accuracy; fiducial class; etc.) or other parameters.

The processing modules can use one or more of: regression (e.g., least squares estimation), classification, neural networks (e.g., convolutional neural networks), heuristics, equations (e.g., weighted equations, etc.), selection (e.g., from a library), instance-based methods (e.g., nearest neighbor), regularization methods (e.g., ridge regression), iterative methods (e.g., RANSAC, iterative minimization approaches, etc.; applied to multiple passes through the same physical space), decision trees, Bayesian methods (e.g., EKF), Monte Carlo methods (e.g., particle filter), kernel methods, probability, deterministic methods, or any other suitable method.

The set of processing modules can utilize one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module can additionally or alternatively utilize one or more of: object model-based detection methods (e.g., edge detection, primal sketch, Lowe, recognition by parts, etc.), appearance-based detection methods (e.g., edge matching, divide and conquer, grayscale matching, gradient matching, histograms of receptive field responses, HOG, large modelbases), feature-based detection methods (e.g., interpretation trees, hypothesize and test, pose consistency, pose clustering, invariance, geometric hashing, SIFT, SURF, bag of words representations, Viola-Jones object detection, Haar Cascade Detection), genetic algorithms, background/foreground segmentation techniques, or any other suitable method for computer vision and/or automated image analysis. Each module can additionally or alternatively be a: probabilistic module, heuristic module, deterministic module, or be any other suitable module leveraging any other suitable computation method, machine learning method, or combination thereof.

Each module can be validated, verified, reinforced, calibrated, or otherwise updated based on newly received, up-to-date measurements; past measurements recorded during the operating session (e.g., driving session); historic measurements recorded during past operating sessions; or be updated based on any other suitable data. Each module can be run or updated: once; at a predetermined frequency; every time the method is performed; every time an unanticipated measurement value is received; or at any other suitable frequency. The set of modules can be run or updated concurrently with one or more other modules, serially, at varying frequencies, or at any other suitable time. Each module can be validated, verified, reinforced, calibrated, or otherwise updated based on newly received, up-to-date data; past data; or be updated based on any other suitable data. Each module can be run or updated: in response to determination of an actual result differing from an expected result; or at any other suitable frequency.

In one variation, the signal analysis system can include: a landmark detection module (which detects the landmark from the sampled signal), a landmark tracking module (which tracks the landmark across sampled signals), a landmark classification module (which classifies the landmark), a parameter extraction module (which extracts object parameters, such as landmark parameters, from the sampled signal), a population correlation module (which correlates parameter values across multiple operation instances, which can account for the vehicle approach angle relative to the landmark), and/or any other suitable processing module.

The landmark detection module functions to detect that a landmark is depicted in image data (e.g., in an image frame, in an image sequence). In a first variation, the system includes a landmark detection module for each of a predetermined set of landmark types. In a second variation, the system includes a global landmark detection module that detects any of the predetermined set of landmark types within image data. The output of the landmark detection module can include bounding boxes (e.g., drawn around all or a portion of the detected landmark), annotated image data (e.g., with detected landmarks annotated), feature vectors based on image words (e.g., embeddings), and any other suitable output. The landmark detection module can apply: feature detection, localization, pattern matching, foreground/background segmentation, stitching/registration, filtering, thresholding, pixel counting, edge detection, color analysis, blob discovery and manipulation, optical character recognition, egomotion, tracking, optical flow, pose estimation (e.g., analytic or geometric methods, genetic algorithms, learning-based methods; e.g., EKF, particle filter, and least squares estimation), or other methods to identify fiducials and extract fiducial parameters from the signals.

The system can additionally include a landmark tracking module that functions to predict relative trajectories between the vehicle system and landmarks identified (e.g., detected, classified, etc.) in image data. The tracking module can also function to reduce the number of images that require de novo landmark recognition and/or detection to be performed, by tracking previously detected and/or classified landmarks between frames in a sequence of image frames. In a first variation, landmark tracking is performed via point tracking, such as by deterministic methods (e.g., with parametric constraints based on the object class of an object) or statistical methods (e.g., Kalman filtering). In a second variation, landmark tracking is performed via kernel filtering and kernel tracking, such as using template-based methods or multi-view appearance methods. In a third variation, landmark tracking is performed via silhouette tracking, such as using shape matching, edge matching, and/or contour tracking. However, object tracking and trajectory prediction and/or determination can be determined using motion analysis or otherwise suitably performed via any suitable method or technique. The landmark tracking module can apply kernel-based tracking, contour tracking, or any other suitable tracking process.

The classification module functions to determine a class of a landmark (e.g., object class, landmark class) depicted in image data. The landmark class can be determined based on extracted image feature values, embeddings, or any other suitable metric determined by the landmark detection module. In a first variation, the classification module can match the embedding values to a vocabulary of image words, wherein a subset of the vocabulary of image words represents a landmark class, in order to determine the class of the detected landmark. In a second variation, the system can include one classification module for each object class, and the object class can be determined by sequentially analyzing the embeddings associated with each object class and then analyzing the results to determine the best match among the classification modules, thereby determining the landmark class (e.g., the class corresponding to the classification module whose results best match the image data). In a third variation, the system includes a cascaded classifier that is made up of hierarchical classification modules (e.g., wherein each parent classification module performs a higher level classification than a child classification module). The output of the classification module can include bounding boxes (e.g., drawn around all or a portion of the classified object), annotated image data (e.g., with landmarks annotated with a text fragment corresponding to an associated landmark class), feature vectors based on image words (e.g., embeddings), and any other suitable output.

In a first specific example of the classification module, the system includes a cascaded sequential classifier wherein a first classification module (e.g., a first module) is executed at the vehicle system, and a second classification module is executed at a remote computing system. In this example, the first classification module determines a landmark class (e.g., "street sign") for a landmark depicted in the image data, and the second classification module determines a landmark subclass for the landmark (e.g., "stop sign").

In a second specific example of the classification module, a first version of the classification module having a first complexity is executed at the vehicle system, and a second version of the classification module having a second complexity is executed at the remote computing system, wherein the second complexity is greater than the first complexity. In this and related examples, the complexity of the module can be represented by a number of artificial neurons in an artificial neural network, wherein the module is implemented as an artificial neural network. In alternative examples, the complexity of the module can be represented by a dimensionality of the model implemented by the module. In further alternatives, the complexity of the module can be represented by the size of an image word vocabulary. However, module complexity can be otherwise suitably represented. The landmark classification module can additionally or alternatively apply: classification, pattern matching, or any other suitable classification or labeling process.

The population correlation module can apply multiple pass trajectory alignment (e.g., using least squares and RANSAC) or any other suitable cross-trajectory correlation process. One or more methods can be combined to increase the accuracy of the processing modules. For example, to achieve consistent fiducial detection at different scales and angles, information from multiple feature detectors can be fused, or synthetic training datasets and generalized feature detectors such as CNNs can be used. In a second example, fiducial detection reliability under different lighting conditions can be increased by applying image intensity transforms, building lighting-specific maps (e.g. daytime and nighttime maps), oversampling landmarks, and/or by applying any other suitable method.

The processing modules can be determined (e.g., generated, calculated, etc.) using: supervised learning (e.g., using logistic regression, using neural networks, such as back propagation NN, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable learning style. Each module can be validated, verified, reinforced, calibrated, or otherwise updated based on newly received, up-to-date measurements; past measurements recorded during the operating session; historic measurements recorded during past operating sessions; or be updated based on any other suitable data. Each module can be run or updated: in response to determination of an actual result differing from an expected result, or at any other suitable frequency. The module(s) can be run or updated: once; at a predetermined frequency; every time the method is performed; every time an unanticipated measurement value is received; or at any other suitable frequency. The module(s) can be run or updated concurrently with one or more other modules, serially, at varying frequencies, or at any other suitable time.

For example, pose estimators can be updated by identifying fiducial features across video frames and measuring the accuracy and robustness of pose estimation algorithms against GPS-RTK ground truth. In a second example, landmark feature extraction modules can be updated by measuring and ranking features by accuracy of pose estimate, and measuring the variation with landmark type and visual conditions, high contrast corners, edges, and/or other landmarks/fiducials. In a third example, the population correlation module can be updated by identifying landmarks, fiducial features, and vehicle paths for a small region, and aligning the multiple passes so that the passes can be compared. In a fourth example, the modules can be iteratively improved by estimating the camera pose and location, testing the performance of algorithms to estimate the invariant features, evaluating the modules to find invariant features in the test regions (e.g., street intersections), and evaluating the accuracy of estimate of fiducial landmarks and convergence of the estimate given multiple passes through an intersection.

The landmark database functions to provide known landmark data. In operation, the system can extract fiducials from video, images, rangefinding measurements, or other measurements, identify the detected fiducial using the landmark database, and use the fiducial information to determine operation parameters (e.g., precise location). The landmarks are preferably invariant landmarks, but can alternatively be variant. The landmarks (fiducials) can include: road signs (stop sign, yield sign, pedestrian crossing sign, street names, exit sign, etc.), road markings (stop bar, stop lines, limit lines, lane markings), light poles, curbs, intersection detail, signal lighting detail, road and roadside infrastructure, streetlight, traffic light, logos (e.g., gas station logos), storefronts, topiary (e.g., trees, bushes), road markings (lane markings), mailboxes, fire hydrants, and/or any other suitable landmark or fiducial (e.g., optical fiducial). The landmark database can store: the fiducial parameter value(s) associated with the vehicle position relative to fiducial; the known geographic location for the fiducial (e.g., to sub-meter or sub-0.5 m accuracy); the pattern of fiducials (e.g., spatial pattern) and/or parameter values associated with a known vehicle location; and/or any other suitable association.

The landmark database can include one or more maps (e.g., sparse map with landmarks for each unit region), matrix (e.g., sparse matrix), table, or other data structure. The maps can be static, be generated in real- or near-real time, or otherwise determined. Different data structures can be for different: geographic regions (e.g., overlapping, non-overlapping; covering the same or different area; etc.), landmark densities, location estimate resolution or precision, operation context (e.g., day/night), route, user account, or any other variable. Different instances of the system and/or method can use the same or different set of maps. For example, the system can reference a global map of fiducial landmarks, given a GPS estimate of vehicle pose and camera information, and generate a local map of vehicle pose given ground-truth landmarks and camera information.

The landmark database can be generated based on municipal data (e.g., a city map); through surveying using a high-resolution location system (e.g., GPS-RTK) and a correlated landmark detection system (e.g., LIDAR to determine distance, pose, and/or dimensions); through cooperative mapping (e.g., identifying the same landmark across multiple passes by the same vehicle or multiple vehicles, associating the landmark with the concurrently determined location estimate, and determining the vehicle location as an average of the location estimates); through annotated aerial maps; or through any other suitable method.

4. Method.

The method 100, an example implementation of which is shown in FIG. 1, is preferably implemented by, at, or otherwise suitably in combination with the system previously described and/or elements thereof. However, the method 100 can additionally or alternatively be implemented by, at, or otherwise suitably in combination with any suitable system.

Figure 5:
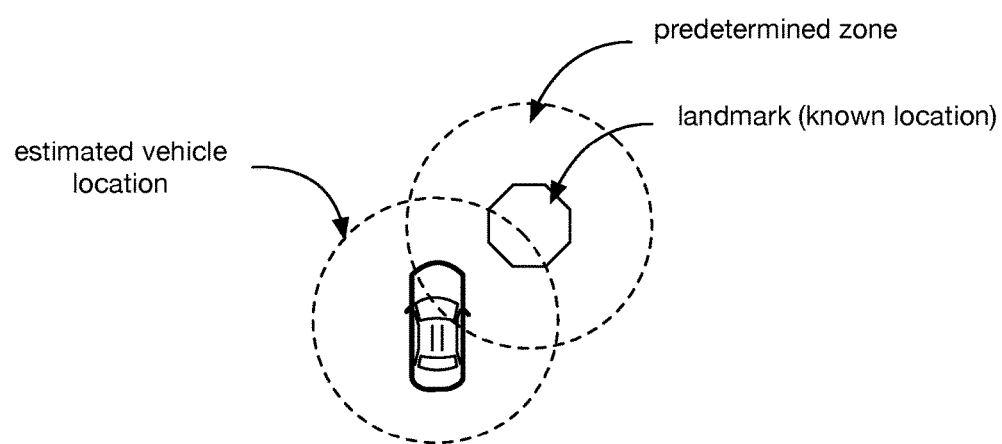
FIG. 5 is an example of a trigger event for method performance.

Detecting a landmark proximal the system S100 functions to identify a reference point with known location for location calibration. The landmark is preferably detected using the signal analysis system, applied to signals sampled by the sensor system, but can alternatively be detected using any other suitable system. The applied processing module can be a universal processing module, a context-specific processing module, or be otherwise selected. S100 can be performed at a predetermined frequency, when an error estimate exceeds a threshold value, when the estimated location encompasses a fiducial location or region (example shown in FIG. 5), and/or at any other suitable time.

In a first variation, S100 includes recording a set of images with the optical sensor (e.g., while vehicle is in operation) and identifying a landmark from the set of images (e.g., using the signal analysis system). For example, identifying the landmark can include: identifying a set of features in an image (e.g., corners, edges) and determining a label for the landmark based on the set of features (e.g., a stop sign when 8 corners are detected; a yield sign when 3 corners are detected). In a specific example, S100 includes identifying landmarks from the forward-facing video stream (recorded by the forward-facing camera) only. In a second specific example, S100 includes identifying landmarks from both the forward-facing video stream and the rearward- or inward-facing video stream recorded by the rearward-facing camera (e.g., analyzing landmarks visible from the side windows, sunroof, and/or rear window). In a second variation, S100 includes receiving a packet broadcast by a landmark. In a third variation, S100 includes detecting an object using a rangefinding system (e.g., based on shape, when the measured distance is less than a threshold value, etc.). In a fourth variation, S100 includes detecting a landmark using the rangefinding system, identifying a region of the image frame corresponding to the landmark location (e.g., the pixels mapped to the rangefinding signal position), and determining the landmark based on the portions of the image frame corresponding to the landmark location (e.g., which side of the landmark is facing the sensor system). In a fifth variation, S100 includes identifying a landmark from a single image (e.g., of a set of images, a single recorded image, etc.). In a sixth variation, S100 includes identifying a plurality of landmarks within an image sequence (e.g., based on multiple frames of a sequence, a single frame, etc.). However, S100 can be otherwise performed.

Figure 7:
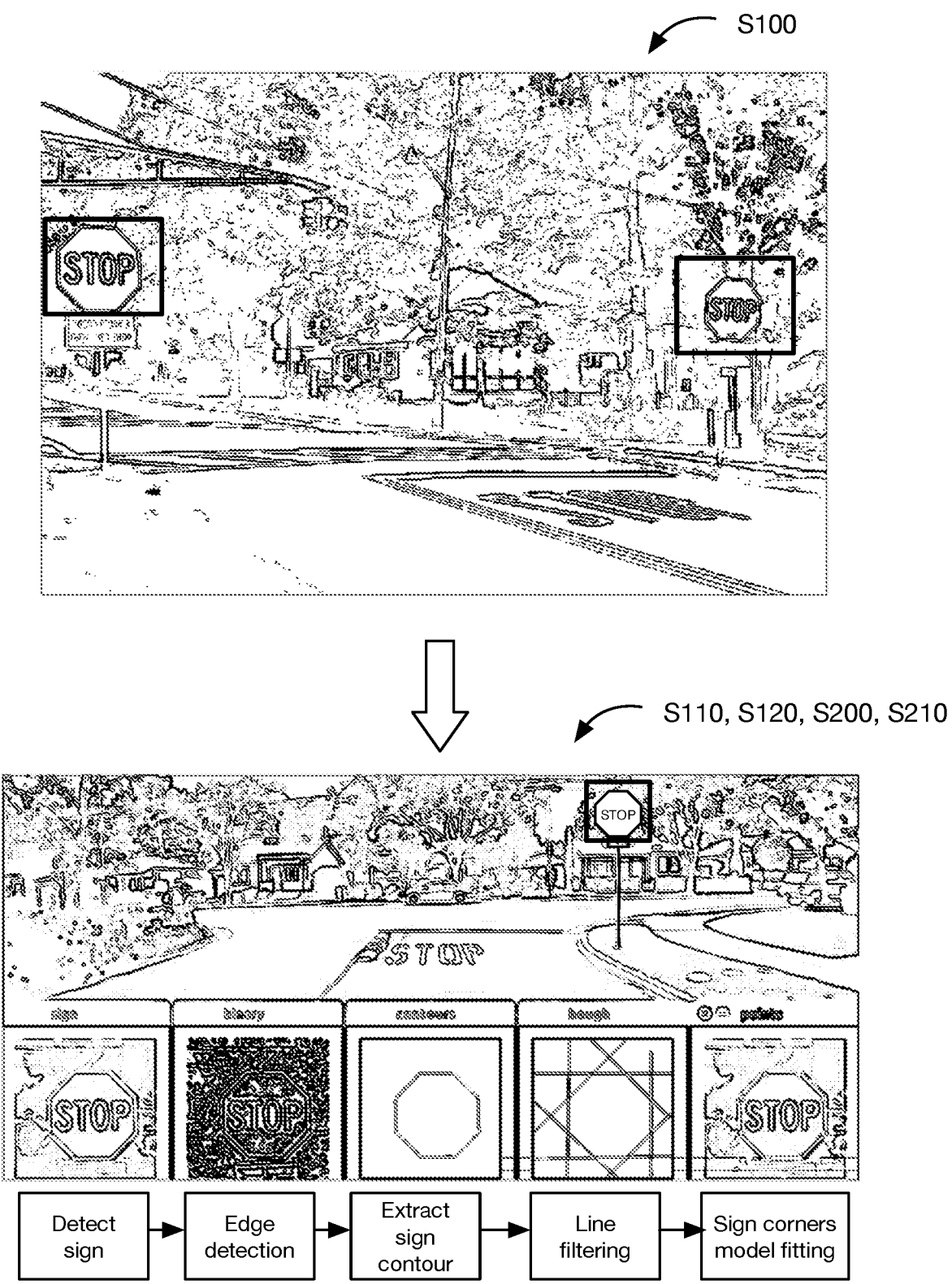
FIG. 7 is an example of processing the recorded image for landmark detection and/or parameter extraction.

S100 can additionally include determining landmark parameters for the detected landmark S110 (example shown in FIG. 7). S110 can be performed by one or more feature detection modules, feature extraction modules, or by any other suitable module. The applied feature detection module can be selected based on: the time of day, the estimated location, a determined unit region (e.g., unit map and/or subunit of a global map associated with the global system location) or otherwise selected. Landmark parameters can include: the landmark location in the image frame, the landmark scale and/or area occupied in frame, the number of pixels corresponding to the landmark, the landmark shape, the landmark pose relative to the sensor system (e.g., based on the distances between adjacent detected landmark features, such as corners), the landmark pose relative to the vehicle, colors (e.g., of the front, back, and/or sides of the landmark), the landmark relationship to other landmarks in the same or different frame/signal (e.g., distribution of detected landmarks, distance between landmarks, relative size, pose, relative position in frame, etc.), text (e.g., textual indicator) or patterns appearing on the landmark or in the frame (e.g., image), reflectivity, or any other suitable information.

S100 can optionally include filtering the detected landmarks S120. S120 can include filtering the detected landmarks based on: contextual parameters (e.g., operation parameters, such as trajectory, route, or angle of approach, time of day, lighting levels, etc.), confidence levels (e.g., feature extraction confidence), or based on any other suitable parameter. For example, S120 can include identifying three landmarks in an image, and filtering the three landmarks to select a single landmark based on the projected (e.g., visible) area of a landmark surface in the image (e.g., based on the landmark having the largest visible area).

Determining the system position relative to the detected landmark S200 functions to determine the system's distance from the landmark and the system's angular position relative to a reference vector on the landmark (e.g., relative to a normal vector extending from the landmark's front face). S200 is preferably performed in response to landmark detection, but can alternatively be performed when the system is within a predetermined geographic region, when the landmark occupies more than a threshold proportion of the image frame, or at any other suitable time. S200 is preferably determined by the signal analysis system (e.g., executed by the sensor system, vehicle, user device, and/or remote computing system), but can be performed by any other suitable system.

In a first variation, S200 includes: calculating the system position relative to the landmark based on a measured signal value and a known signal value (e.g., a known parameter of the landmark). For example, the system distance to the landmark can be calculated from the measured RSSI and a reference RSSI value associated with a 1 m distance from the landmark. The landmark's angular position relative to the system can further be determined from the angle of signal arrival. In a second example, the system distance to the landmark can be calculated from the number and spatial distribution of pixels occupied by a stop sign in the sampled image and a reference number and spatial distribution of pixels associated with a known system distance and pose from the stop sign (e.g., 1 m away at 0° from the front face normal).

In a second variation, S200 includes: determining the landmark signal values from the sampled signal and looking up the system position (e.g., height, angular position, distance, etc.) based on the landmark signal values. In this variation, the landmark database can include a plurality of landmark signal value combinations for the landmark, each combination associated with a different system position.

Figure 3:
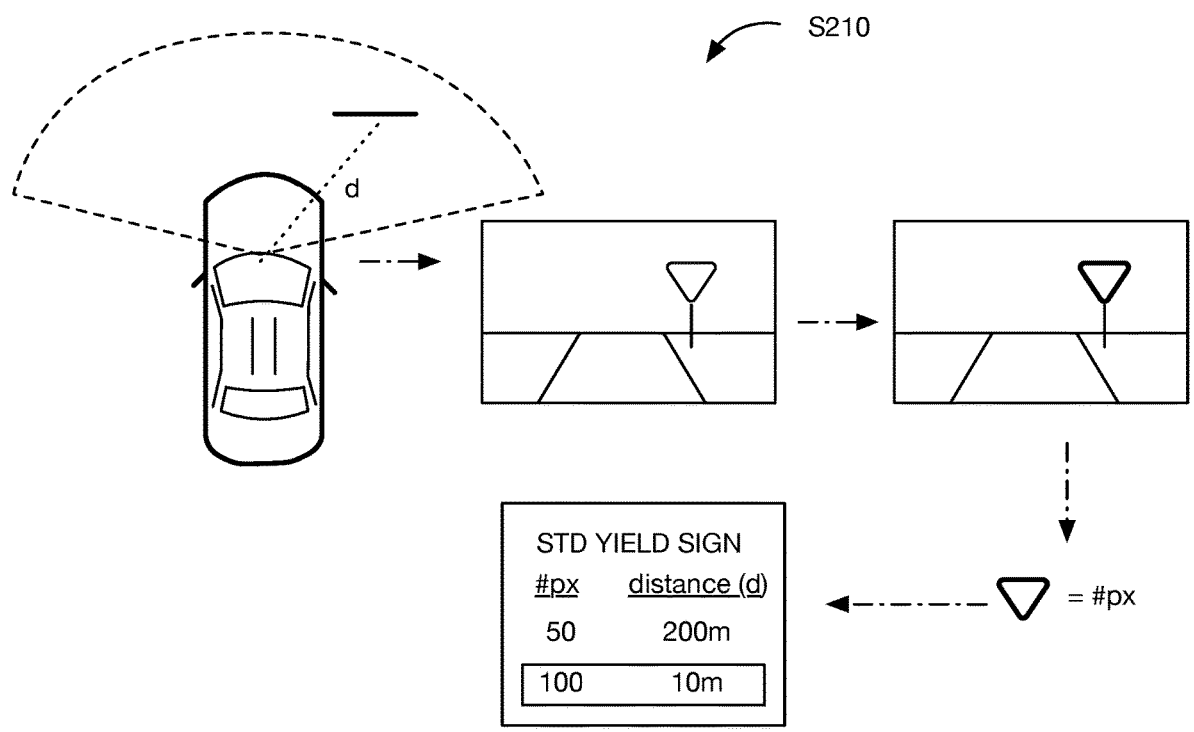
FIG. 3 is an example of determining the system position based on landmark parameter values.

In a third variation, S200 includes determining the system position based on landmark parameter values S210. S210 can be performed using classification, pattern matching, localization methods, convolutional neural networks, genetic algorithms, or any other suitable method. In a first embodiment, S210 includes: determining a known landmark parameter value (e.g., standard dimensions) for the detected landmark type or class (e.g., a stop sign), extracting estimated landmark parameter values from the sampled signal (e.g. determining the landmark dimensions based on the number and distribution of landmark pixels, wherein each pixel is pre-mapped to a predetermined physical size), determining a scaling factor based on the known and measured landmark dimensions, and determining the distance to the landmark (or landmark feature) based on the scaling factor (specific example shown in FIG. 3).

In some variations, S210 can include determining a known parameter value of a landmark based on the type or class of the landmark. In such variations, the known parameter is preferably based on categorical information associated with the landmark type in lieu of empirical measurement (e.g., by a high resolution three-dimensional mapping tool). Alternatively, the known parameter can be based on any other suitable information associated with the landmark. In a first example, the known parameter includes a known dimension (e.g., a known size and shape associated with a standardized stop sign) that is associated with a local region (e.g., a city, a state, a country) and characterizes each instance of the landmark present in the local region. Thus, in this example, a depiction of an instance of the aforementioned landmark type that is identified in a recorded image can be compared to the known dimension in order to derive the precise relative position between the vehicle and the landmark based on the known parameter (e.g., without requiring predetermined parameters of the landmark to be measured empirically). In a second example, the known parameter includes a font of a textual indicator written on a class of landmark (e.g., a stop sign, a yield sign). Thus, in this example, the apparent font (e.g., as the result of the perspective from which an image of the textual indicator is captured) of a textual indicator extracted from an image of an instance of the aforementioned landmark type can be compared to the known font to determine the precise relative position between the vehicle and the landmark. However, S210 can be otherwise suitably performed.

In a second embodiment, the image frame can be divided into a set of horizontal bands, wherein each horizontal band is associated with a different distance. The landmark distance from the system can be estimated based on which horizontal band the landmark is detected in. In a specific example of this embodiment, one or more image processing algorithms can be used to extract the location of a landmark depiction within the image (e.g., the pixels of the image that depict the landmark), identify the horizontal band in which the centroid of the image depiction is located, and calculate the relative distance between the vehicle (e.g., at the location of the camera system at the vehicle) and the landmark based on the horizontal band (e.g., wherein a horizontal band closer to the top of the image is associated with a distance farther from the vehicle than a horizontal band closer to the bottom of the image). The horizontal bands are preferably aligned with the rectilinear coordinates of the image, but can alternatively be aligned according to any suitable coordinates relative to the image coordinates.

In a third embodiment, the image frame can be divided into a set of vertical bands, wherein each vertical band is associated with a different angular position relative to the system. The landmark's angular position relative to the system can be estimated based on which vertical band the landmark is detected in. In a specific example of this embodiment, one or more image processing algorithms can be used to extract the location of a landmark depiction within the image (e.g., the pixels of the image that depict the landmark), identify the vertical band in which the centroid of the image depiction is located, and calculate the relative angular position between the vehicle (e.g., at the location of the camera system at the vehicle) and the landmark based on the vertical band (e.g., wherein a vertical band closer to the left edge of the image is associated with a more acute angle between the direction of vehicle movement and the landmark position than a vertical band closer to the right edge of the image). The vertical bands are preferably aligned with the rectilinear coordinates of the image, but can alternatively be aligned according to any suitable coordinates relative to the image coordinates.

Alternatively, the image frame may be partitioned in any manner based on predicted or measured coordinate spaces (e.g., divided into partitions corresponding to different range, angle, velocity, or position intervals).

In a fourth variation, the system position relative to the landmark is determined by applying a CNN or other neural network to the recorded signals. In a fifth variation, the system position relative to the landmark is determined based on the system trajectory (e.g., as determined using optical flow, vehicle steering signals, etc.). However, the system position can be otherwise determined.

Determining a global system location based on the system position, relative to the detected landmark S300 functions to determine a precise global system location. S300 is preferably performed in response to S100 occurrence, but can alternatively be performed when the system is within a predetermined geographic region, when the landmark occupies more than a threshold proportion of the image frame, or at any other suitable time. S200 is preferably determined by a position determination module (e.g., executed by the sensor system, vehicle, user device, and/or remote computing system), but can be performed by any other suitable system.

Figure 4:
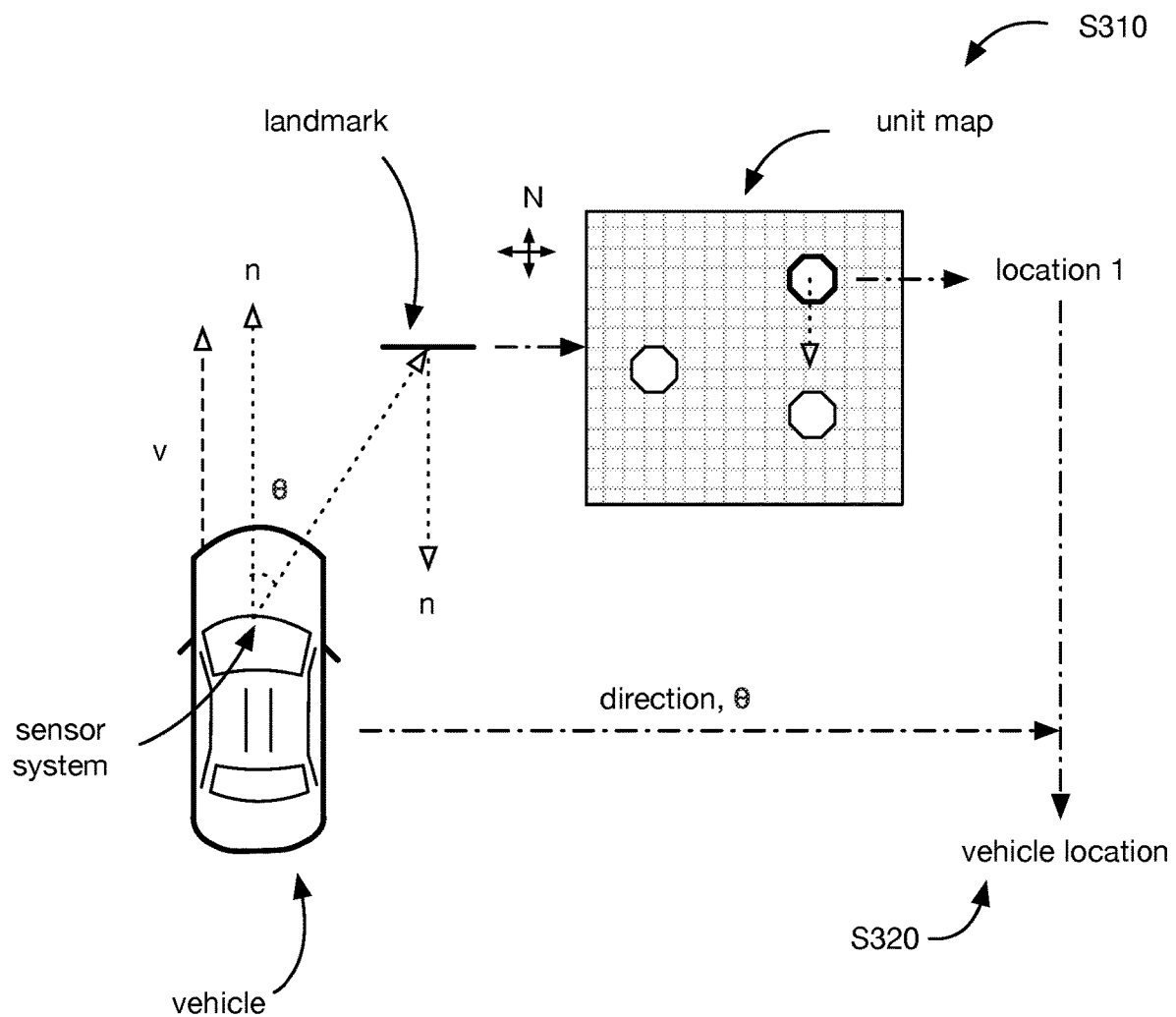
FIG. 4 is an example of determining a precise system location based on the system position and the known landmark location.

S300 can include: determining (e.g., retrieving) a known landmark location for each detected landmark S310; and determining the global system location based on the known landmark location and the system position relative to the detected landmark S320, example shown in FIG. 4. However, S300 can be otherwise performed.

Determining the known landmark location for each detected landmark S310 functions to determine a precise reference location. The known landmark location is preferably retrieved from the landmark database, but can be otherwise determined.

In a first variation, S310 includes: extracting a pattern of multiple landmarks from the set of images; matching the extracted pattern to a known pattern of landmarks (e.g., a landmark fingerprint) associated with a known geographic location; and assigning the known geographic location (for the known landmark pattern) as the system location. The pattern can include a static pattern associated with a plurality of landmarks in a single image; for example, S310 can include extracting a set of landmark geographic locations from an image of a plurality of landmarks, each landmark having an associated pose from which the relative position between the vehicle system and the landmark can be determined and a geographic location that can be retrieved from a landmark database or otherwise suitably determined, and thereby determining the global system location. The pattern can additionally or alternatively include a temporal pattern associated with one or more landmarks that appear in a plurality of successive images; for example; S310 can include extracting a relative trajectory between a landmark depicted in a series of images and the vehicle system, and determining the global system location based on the trajectory and the landmark geographic location (e.g., retrieved or otherwise suitably determined).

In a second variation, S310 includes: identifying (e.g., selecting, retrieving, etc.) a set of unit regions (e.g., unit maps) encompassed by the vehicle location estimate (e.g., from the secondary location system); and identifying a known landmark within the identified unit region set based on the landmark parameter values.

In a third variation, S310 includes: identifying a textual location indicator (e.g., street name, city name, etc.), identifying a set of unit regions (e.g., maps) associated with the location indicator, and identifying a landmark within the identified unit region set based on the landmark parameter values. In a specific example, S310 can include identifying a street name depicted on a street sign, querying a remote map database using the street name as the basis for the query, retrieving a local map (e.g., a map of the vehicle surroundings within a 1 mile radius, a 100 meter radius, or any other suitable radius) including landmark parameters associated with each landmark in the local area (e.g., unit region), and identifying a known landmark within the local area based on the landmark parameters associated with one of the landmarks in the local area (e.g., from an image captured by the vehicle system of a proximal landmark). However, S310 can be otherwise performed.

S310 can optionally include uniquely identifying the detected landmark S312. The landmark can be uniquely detected based on the vehicle trajectory or route (and/or landmark trajectory relative to the vehicle), the landmark direction (e.g., face exposed to the sensor system), the landmark pose relative to the sensor system (e.g., left, right, high, low, etc.), or based on any other suitable parameter. For example, a stop sign within the identified unit region (e.g., an intersection) can be uniquely identified based on the vehicle trajectory (e.g., determined from the planned route, from optical flow analysis of recorded video, etc.), the stop sign's pose relative to the sensor system (e.g., based on the detected features; identified text; etc.), and the stop sign's face imaged by the sensor system (e.g., determined based on the sign's color or reflectivity). However, the landmarks can be otherwise uniquely detected.

Determining the global system location based on the known landmark location and the system position relative to the detected landmark S320 functions to determine a high-precision system position, based on the high-precision reference locations (e.g., the landmark locations). The global system location is preferably calculated, but can alternatively be estimated, selected from a table, or otherwise determined. The global system location is preferably determined based on the system position relative to the landmark (determined in S200), but can be determined based on any other suitable positional relationship between the system and the landmark determined in any other suitable manner.

Figure 6:
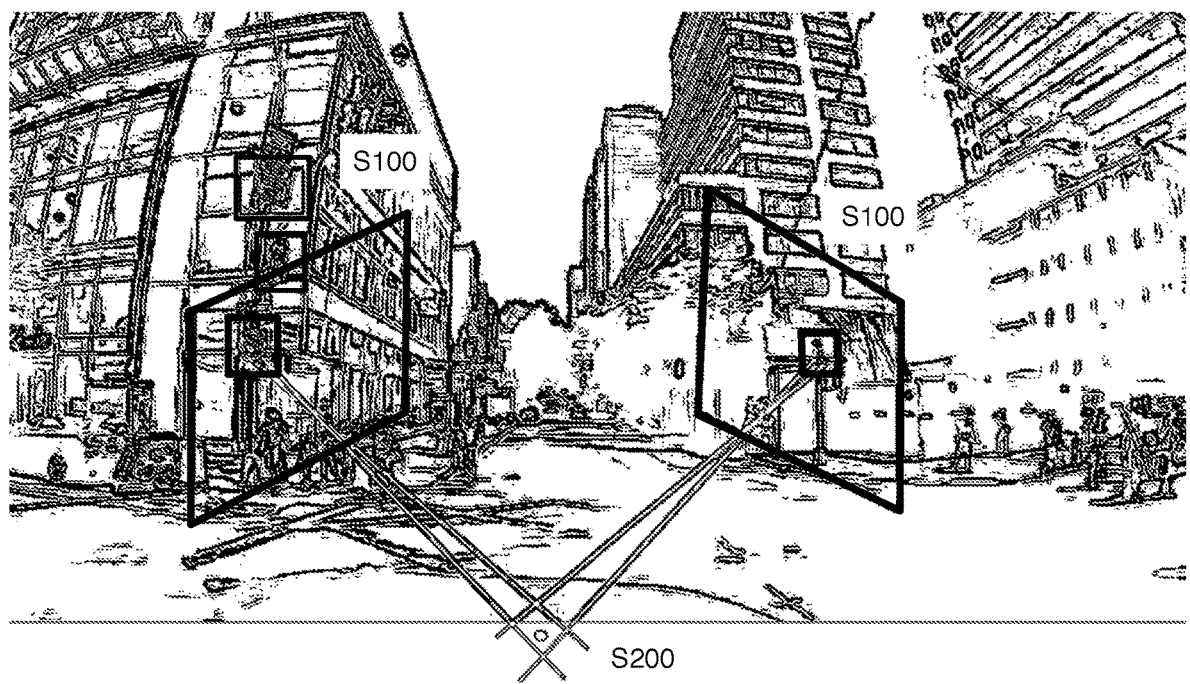
FIG. 6 is an example of trilaterating the system location based on locations for multiple detected landmarks.

In a first variation, the global system location is calculated using the determined system angular position and distance from the known landmark location. In a second variation, the global system location is trilaterated based on the known locations for a plurality of landmarks (e.g., based on a plurality of identified landmarks) and the system's determined angular position and distance relative to the respective landmarks (example shown in FIG. 6). However, the global system location can be otherwise determined.

The method can optionally include routing the vehicle S400, which functions to navigate the vehicle according to a determined (or predetermined) route based on the localized and/or mapped position of the vehicle. S400 can include controlling the vehicle (e.g., autonomously) according to the determined global system location and/or precise system location relative to an identified landmark position (e.g., in order to avoid an obstacle, to achieve a desired destination, etc.).

In a first variation, S400 includes routing the vehicle based on the location error. For example, in cases during vehicle operation when the location error exceeds a threshold value, the computing system can route the vehicle to the vicinity of known landmarks in order to compensate for the location error. In a related example, the computing system can route the vehicle based on the accumulation rate of the location error exceeding a predetermined threshold rate. In an example embodiment, S400 can include determining a route based on an available landmark density along the determined route, and routing the vehicle according to the determined route (e.g., including in instances wherein the determined route is a greater overall distance between the origin and the destination but includes a higher landmark density). Thus, determining a route can be performed such that the location error at each point along the route is minimized, but can additionally or alternatively be performed to optimize the travel time, the distance traveled, or any other suitable navigation-related parameter.

In a second variation, S400 includes routing the vehicle based on data received from a secondary vehicle. In a first example, the secondary vehicle determines its global system location based on a landmark proximal to the secondary vehicle, the computing system (e.g., including a module associated with the vehicle and a module associated with the secondary vehicle) determines the relative position between the vehicle and the secondary vehicle (e.g., according to a time-of-flight packet transmission measurement, based on the output of a rangefinding system, based on image processing of an image of the rear portion of the secondary vehicle captured at a camera of the first vehicle, etc.), determines the global system location of the vehicle based on the aforementioned relative position, and routes the vehicle according to the determined global system location.

S400 can additionally or alternatively include routing the vehicle in any suitable manner, according to and/or based upon any suitable data derived from other Blocks of the method 100.

The method can optionally include generating the landmark database S500, which functions to catalogue the geographic locations associated with landmarks (e.g., the respective geographic location of each landmark) and associate the geographic locations with parameters of the landmarks that can be extracted to determine the relative position between a vehicle system element (e.g., a camera) and the landmark. S500 can also function to determine and store known landmark data for subsequent retrieval and/or utilization. S500 can include extracting fiducials from video, images, rangefinding measurements, or other measurements, identifying the detected fiducial using the landmark database, and using the fiducial information to determine operation parameters (e.g., precise location). The landmarks used to generate the landmark database are preferably invariant landmarks, but can alternatively be variant (e.g., changing on any suitable time scale). The landmarks (fiducials) can include: road signs (stop sign, yield sign, pedestrian crossing sign, street names, exit sign, etc.), road markings (stop bar, stop lines, limit lines, lane markings), light poles, curbs, intersection detail, signal lighting detail, road and roadside infrastructure, streetlight, traffic light, logos (e.g., gas station logos), storefronts, topiary (e.g., trees, bushes), road markings (lane markings), mailboxes, fire hydrants, and/or any other suitable landmark or fiducial (e.g., optical fiducial). S500 can include storing: the fiducial parameter value(s) associated with the vehicle position relative to fiducial; the known geographic location for the fiducial (e.g., to sub-meter or sub-0.5 m accuracy); the pattern of fiducials (e.g., spatial pattern) and/or parameter values associated with a known vehicle location; pose-position pairs (e.g., associations between specific landmark poses and relative positions of a camera or other imaging system imaging the landmark and viewing the specific posee); and/or any other suitable association.

Generating the landmark database can include producing one or more maps (e.g., sparse map with landmarks for each unit region), matrices (e.g., sparse matrices), tables, or other data structures. The maps can be static, be generated in real- or near-real time, or otherwise determined. Different data structures can be generated for different: geographic regions (e.g., overlapping, non-overlapping; covering the same or different area; etc.), landmark densities, location estimate resolution or precision, operation context (e.g., day/night), route, user account, or any other variable. Different instances of the method can use the same or different set of maps. For example, S500 can include referencing a global map of fiducial landmarks, given a GPS estimate of vehicle pose (and/or landmark pose) and camera information, and generate a local map of vehicle pose given ground-truth landmarks and camera information.

In variations, S500 can include generating the landmark database and/or related maps based on municipal data (e.g., a city map); through surveying using a high-resolution location system (e.g., GPS-RTK) and a correlated landmark detection system (e.g., LIDAR to determine distance, pose, and/or dimensions); through annotated aerial maps; or through any other suitable method or process.

In a first specific example, S500 includes determining a relative position between the vehicle and the landmark position (e.g., using a secondary location system), determining a landmark geographic location based on the global system location and the relative position, associating the landmark pose (e.g., from the perspective of the camera of the vehicle system) and the relative position to generate a pose-position pair; and storing the pose-position pair and the landmark geographic location at the landmark database. The vehicle system can use the stored pose-position pair (e.g., after retrieval from a remote landmark database, a local landmark database, etc.) to compare recorded images to the database and thereby determine the relative position between the vehicle system and the landmark and thus the global system location of the vehicle system.

Figure 9:
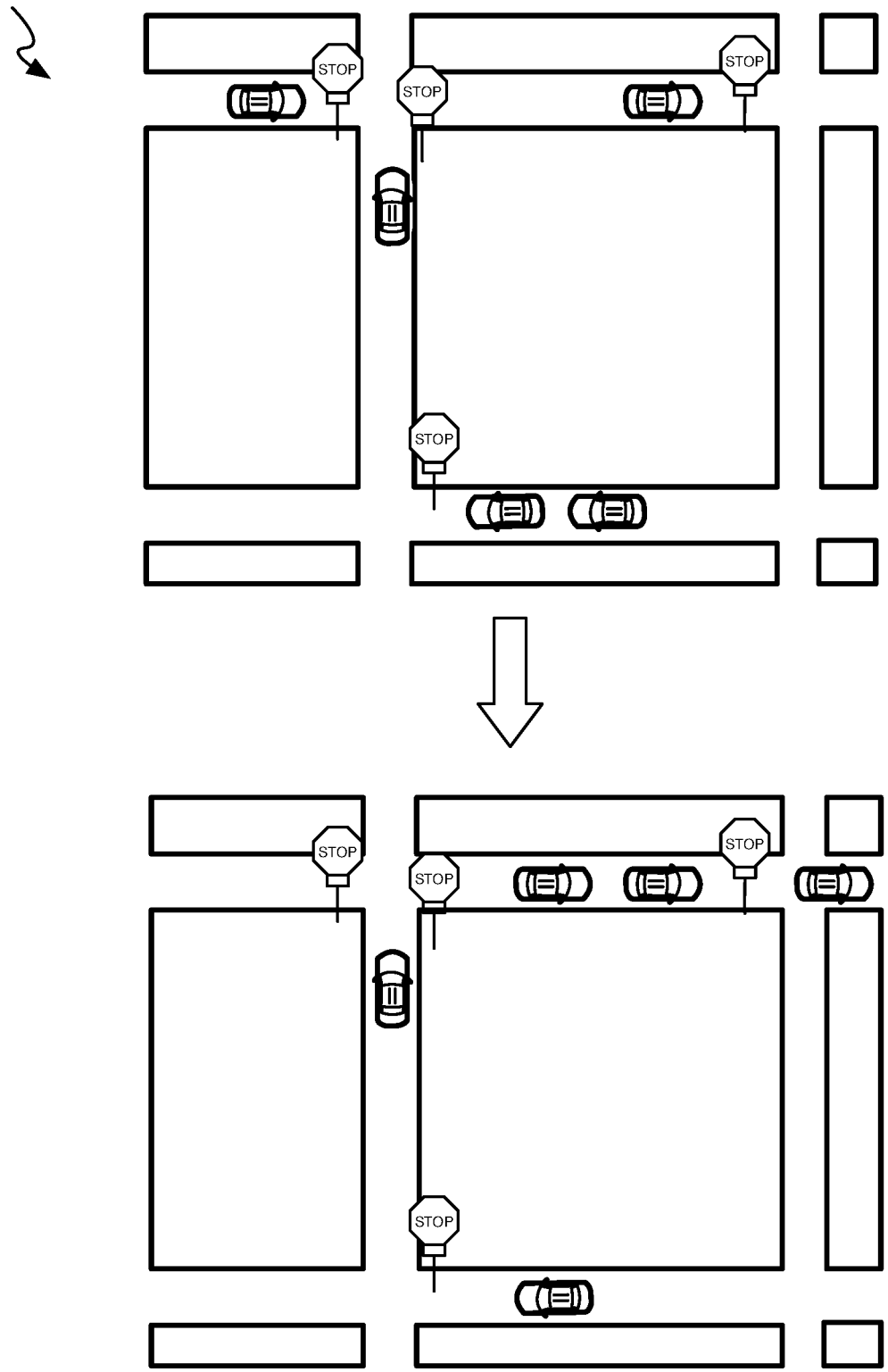

In a second specific example, as shown in FIG. 9, S500 can include cooperatively generating a landmark database S510. S510 can include identifying the same landmark across multiple passes corresponding to multiple vehicles, associating the landmarks with a concurrently determined location estimate for each landmark as well as a set of landmark parameters corresponding to a set of relative locations between a vehicle (e.g., the camera system of a vehicle), and determining the landmark geographic location of each landmark and the associated landmark parameters as an average of the location estimates and associated landmark parameters. However, S510 can include otherwise suitably cooperatively generating a landmark database (e.g., map of landmarks and associated data).

S500 can include determining a trust score, wherein the trust score can be assigned to a landmark parameter (e.g., a shape of the landmark, the geographic location of the landmark, etc.) based on the cooperative determination of the parameter. For example, the trust score can increase as successive vehicles determine the landmark parameter and obtain mutual agreement (e.g., based upon quantitative comparison) of the parameter value, set of values, or range of values. The determined trust score can be associated with landmark parameter values in the database, and in some variations, determining the landmark parameters can be based on the trust score (e.g., retrieving parameter values associated with the highest trust score). In other variations, determining the landmark parameters can include computing a weighted average of stored landmark parameters based on the trust score (e.g., parameters associated with a higher trust score having a higher weight in the weighted average). Any blocks of the method 100 can be performed based on a trust score as determined in block S500.

Additionally or alternatively, S500 can include otherwise suitably generating the landmark database.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An apparatus comprising:
   a camera configured to be mounted to a vehicle for viewing a region forward of the vehicle during vehicle motion, the camera configured to provide an image, wherein the vehicle is associated with a global system location and a location error; and
   a computing system associated with the vehicle, the computing system comprising:
      a landmark identification module configured to identify a landmark depicted in the image, wherein the landmark is associated with a landmark geographic location and a known dimension, and
      a feature extraction module configured to determine a landmark parameter based on the image,
   wherein the computing system is configured to:
      determine a relative position between the vehicle and the landmark geographic location based on the landmark parameter,
      update the global system location based on the relative position,
      set the location error to an error value after the global system location is updated, and
      change the location error after the global system location is updated; and
   wherein the computing system is configured to provide an output for assisting a control of the vehicle; and
   wherein the landmark comprises a street sign having a set of corners, and wherein the feature extraction module is configured to determine a set of pixel positions in the image corresponding with the set of corners, and to determine the landmark parameter based on the set of pixel positions.

2. The apparatus of claim 1, wherein the landmark is one of a plurality of landmarks depicted in the image, wherein the landmark identification module is configured to identify the plurality of landmarks depicted in the image, each of the plurality of landmarks associated with a corresponding landmark geographic location;
   wherein the feature extraction module is configured to determine a landmark pose associated with each of the plurality of landmarks from the image; and
   wherein the computing system is configured to determine a set of relative positions between the vehicle and each of the plurality of landmarks based on the determined landmark poses associated with the respective landmarks, and determine the global system location based on the set of relative positions.

3. The apparatus of claim 1, wherein the computing system further comprises a communication module configured to:
   transmit the global system location to a second vehicle associated with a second global system location;
   determine a second relative position between the second vehicle and the vehicle; and
   update the second global system location based on the global system location and the second relative position.

4. The apparatus of claim 1, wherein the computing system is configured to determine another relative position between the vehicle and the landmark geographic location.

5. The apparatus of claim 1, wherein the computing system is configured to retrieve the landmark geographic location of the landmark from a remote database.

6. The apparatus of claim 1, wherein the computing system is configured to determine a unit region based on the global system location, and retrieve the landmark geographic location from a storage based on the unit region.

7. The apparatus of claim 1, wherein the landmark parameter comprises a textual location indicator, and wherein the computing system is configured to determine a unit region based on the textual location indicator, and retrieve the landmark geographic location from a storage based on the unit region.

8. The apparatus of claim 1, wherein the computing system is configured to determine a route based on an accumulation rate of the location error exceeding a threshold accumulation rate value.

9. The apparatus of claim 1, wherein the vehicle comprises an autonomous vehicle.

10. The apparatus of claim 1, wherein the computing system is configured to determine a speed value and a heading value associated with the vehicle based on the landmark parameter, and wherein the speed value is associated with a speed error, and wherein the heading value is associated with a heading error.

11. The apparatus of claim 10, wherein the computing system is configured to repeatedly update the global system location based on the speed value and the heading value, and repeatedly update the location error based on the speed error and the heading error.

12. The apparatus of claim 1, wherein the computing system is configured to obtain a wheel RPM value from a rotations-per-minute (RPM) sensor, and wherein the computing system is configured to determine a speed value based on the wheel RPM value in combination with a known wheel diameter.

13. The apparatus of claim 1, wherein the landmark is one or a plurality of landmarks depicted in the image, wherein the landmark identification module is configured to identify the plurality of landmarks depicted in the image, wherein each of the plurality of landmarks is associated with a corresponding landmark geographic location;

wherein the feature extraction module is configured to determine a set of landmark parameters associated with each of the plurality of landmarks from the image; and wherein the computing system is configured to determine a pattern based on the set of landmark parameters associated with the respective landmarks, and determine the global system location based on the pattern.

14. The apparatus of claim 1, wherein the computing system is also configured to:

determine a temporal pattern based at least in part on the landmark parameter; and determine a vehicle trajectory based on the temporal pattern.

15. The apparatus of claim 1, wherein the apparatus is configured to record the image based on a satisfaction of a criterion.

16. The apparatus of claim 15, wherein the criterion is associated with a threshold.

17. The apparatus of claim 1, wherein the computing system is configured to update the global system location based on a predetermined frequency.

* * * * *